US008943270B2

(12) United States Patent
Nagasaki et al.

(10) Patent No.: US 8,943,270 B2
(45) Date of Patent: Jan. 27, 2015

(54) STORAGE SYSTEM, STORAGE CONTROL METHOD AND STORAGE CONTROL PROGRAM

(75) Inventors: Hideki Nagasaki, Odawara (JP); Hirokazu Ogasawara, Odawara (JP); Taro Ishizaki, Odawara (JP)

(73) Assignee: Hitachi, Ltd., Tokyo (JP)

( * ) Notice: Subject to any disclaimer, the term of this patent is extended or adjusted under 35 U.S.C. 154(b) by 207 days.

(21) Appl. No.: 13/639,926

(22) PCT Filed: Jul. 24, 2012

(86) PCT No.: PCT/JP2012/004711
§ 371 (c)(1),
(2), (4) Date: Oct. 8, 2012

(87) PCT Pub. No.: WO2014/016866
PCT Pub. Date: Jan. 30, 2014

(65) Prior Publication Data
US 2014/0032837 A1    Jan. 30, 2014

(51) Int. Cl.
*G06F 12/00*    (2006.01)
*G06F 13/16*    (2006.01)

(52) U.S. Cl.
CPC ............... *G06F 12/00* (2013.01); *G06F 13/16* (2013.01)
USPC ........... 711/114; 711/170; 711/173; 365/222; 714/723

(58) Field of Classification Search
CPC ............ G06F 11/2082; G06F 11/2064; G06F 11/1451; G06F 2201/82; G06F 2201/84; G06F 17/30215; G06F 17/30578
See application file for complete search history.

(56) References Cited

U.S. PATENT DOCUMENTS

| 8,006,061 B1 | 8/2011 | Chatterjee et al. |
| 2006/0206582 A1* | 9/2006 | Finn .............................. 709/217 |
| 2009/0144732 A1* | 6/2009 | Tanaka .............................. 718/1 |
| 2011/0167236 A1 | 7/2011 | Orikasa et al. |
| 2011/0289287 A1* | 11/2011 | Yamamoto et al. ........... 711/156 |

* cited by examiner

*Primary Examiner* — Aimee Li
*Assistant Examiner* — Jean Edouard
(74) *Attorney, Agent, or Firm* — Volpe and Koenig, P.C.

(57) ABSTRACT

In tiered storage subsystems in which pages are automatically allocated to appropriate storage media based on the access frequency in page units, since the number of storage media is not simply proportional to the performance, it was difficult to design in advance a tier configuration satisfying the required performance. According to the present invention, a cumulative curve of I/O distribution is created based on a result of measurement of I/O accesses performed to the storage subsystem, and RAID groups (RG) are allocated sequentially in order from RGs belonging to tiers having higher performances to the cumulative curve of I/O distribution. When either a performance limitation value or a capacity of the RG exceeds the cumulative curve of I/O distribution, a subsequent RG is allocated, and the process is repeated so as to compute the optimum tier configuration.

12 Claims, 44 Drawing Sheets

Fig. 7

| VVOL_ID | POOL_ID | Application |
|---------|---------|-------------|
| 00 | 00 | Mail Server |
| 01 | 00 | OLTP Database |
| ... | ... | ... |

| VVOL_ID | Virtual Page ID | I/O Count Per I/O Type | Total I/O Count | Average I/O Count | Maximum I/O Count | Final I/O Time |
|---|---|---|---|---|---|---|
| 00 | 00000 | | 1000 | 100 | 200 | 17:00 |
| 00 | 00001 | | 20 | 2 | 5 | 12:00 |
| ... | ... | | ... | ... | ... | ... |
| 01 | 00000 | | — | — | — | — |
| 01 | 00001 | | — | — | — | — |
| ... | ... | | ... | ... | ... | ... |

801: VVOL_ID, 802: Virtual Page ID, 803: Total I/O Count, 804: Average I/O Count, 805: Maximum I/O Count, 806: Final I/O Time, 80: 81: I/O Count Per I/O Type

| VVOL_ID | Virtual Page ID | Random Read I/O | Random Write I/O | Sequential Read I/O | Sequential Write I/O | Random Read Hit | Random Write Hit | Random KB Transfer | Sequential KB Transfer |
|---|---|---|---|---|---|---|---|---|---|
| 00 | 00000 | 500 | 500 | 0 | 0 | 10 | 12 | 4 | 12 |
| 00 | 00001 | 10 | 9 | 0 | 1 | 1 | 0 | 4 | 8 |
| ... | ... | ... | ... | ... | ... | ... | ... | ... | ... |
| 01 | 00000 | | | | | | | | |
| 01 | 00001 | | | | | | | | |
| ... | ... | | | | | | | | |

811: Random Read I/O, 812: Random Write I/O, 813: Sequential Read I/O, 814: Sequential Write I/O, 815: Random Read Hit, 816,817: Random Write Hit, 818: Random KB Transfer, 81: Sequential KB Transfer

Fig. 9

| POOL_ID | Real Page ID | Virtual Page ID | VVOL_ID | TIER_ID | LDEV_ID | RG_ID | RAID_Level |
|---|---|---|---|---|---|---|---|
| 00 | 00001 | 00000 | 00 | 01 | 01 | 01 | 6D+2P |
|  | 00002 | 00001 | 00 | 00 | 01 | 01 | 6D+2P |
|  | ... | ... | 00 | ... | ... | ... | ... |
|  | 00020 | 00100 | 01 | 01 | 02 | 02 | 6D+2P |
|  | ... | ... | ... | ... | ... | ... | ... |
|  | 00100 | - | - | - | - | - | - |
| ... | ... | ... | ... | ... | ... | ... | ... |

Fig.10

| Virtual Page ID | Migration Source TIER_ID | Migration Destination TIER_ID | Migration STATUS |
|---|---|---|---|
| 10001 | 00 | 01 | Migrated |
| 10002 | 01 | 02 | Migrated |
| 10005 | 02 | 03 | During Migration |
| 10008 | 03 | 01 | During Migration |
| 10014 | 01 | 00 | Not Migrated |
| ... | ... |  | ... |

Fig. 16

Workload Information

Enter the required application or workload information.
Place your cursor on the top of each column to display a description.

About   Home

⊕ Add Row    ⊖ Delete Row    🖥 Modify Workload Type    ⓘ Download Workload CSV Template    ⬇ Import from Workload CSV File

161

| ☐ | No ▲ | Workload Type | Capacity (GB) | IOPS | Tier Level | Comment |
|---|---|---|---|---|---|---|
| ☐ | 1 | OLTP Database | 20000 | 10000 | Level1 | |
| ☐ | 2 | Mail Server | 5000 | 5000 | Level5 | |
| ☐ | 3 | Backup Archive | 1234 | 5678 | All | |
| ☐ | 4 | Workload Type1 | 1000 | 1000 | All | |
| ☐ | 5 | Workload Type2 | 1000 | 1000 | All | |
| ☐ | 6 | Workload Type3 | 1000 | 1000 | All | |
| ☐ | 7 | Workload Type4 | 1000 | 1000 | All | |
| ☐ | 8 | Workload Type5 | 1000 | 1000 | All | |
| ☐ | 9 | Workload Type6 | 1000 | 1000 | All | |
| ☐ | 10 | Workload Type7 | 1000 | 1000 | All | |
| ☐ | 11 | Workload Type8 | 1000 | 1000 | All | |
| ☐ | 12 | Workload Type9 | 1000 | 1000 | All | |
| ☐ | 13 | Workload Type10 | 1000 | 1000 | All | |
| ☐ | 14 | Workload Type11 | 1000 | 1000 | All | |
| ☐ | 15 | Workload Type12 | 1000 | 1000 | All | |

Next >

Fig.18

Drive Configuration

Place your cursor on the top of each column to display a description.

Drive Type Information

Choose the drive types to use and RAID level from the pull down menu. Input relocation buffer (%), new page buffer (%) and optionally, drive price for each drive type. These settings are applied to the drive options screen.

About   Home

↻ Restore Default Drive Prices

| ☐ | Drive Type | RAID Level | Relocation Buffer (%) | New Page Buffer (%) | Drive Price |
|---|---|---|---|---|---|
| ☑ | SSD-200GB (2.5") | RAID5 (7D+1P) ▶ | 2 ◀▶ | 0 ◀▶ | 25210 ◀▶ |
| ☑ | SSD-400GB (3.5") | RAID5 (7D+1P) ▶ | 2 ◀▶ | 0 ◀▶ | 36296 ◀▶ |
| ☑ | SAS-146GB 15K rpm (2.5") | RAID6 (6D+2P) ▶ | 2 ◀▶ | 8 ◀▶ | 1930 ◀▶ |
| ☑ | SAS-300GB 10K rpm (2.5") | RAID6 (6D+2P) ▶ | 2 ◀▶ | 8 ◀▶ | 1200 ◀▶ |
| ☑ | SAS-600GB 10K rpm (2.5") | RAID6 (6D+2P) ▶ | 2 ◀▶ | 8 ◀▶ | 2040 ◀▶ |
| ☑ | SAS-900GB 10K rpm (2.5") | RAID6 (6D+2P) ▶ | 2 ◀▶ | 8 ◀▶ | 2360 ◀▶ |
| ☑ | SAS-2TB 7.2K rpm (3.5") | RAID6 (6D+2P) ▶ | 2 ◀▶ | 8 ◀▶ | 2420 ◀▶ |
| ☑ | SATA-2TB 7.2K rpm (3.5") | RAID6 (6D+2P) ▶ | 2 ◀▶ | 8 ◀▶ | 2520 ◀▶ |
| ☑ | Universal Volume | ▶ | | | |

Universal Volume Information

Storage : AMS2000  Drive Type : SATA-3TB 7.2K rpm (3.5")
RAID Level : RAID5 (8D+1P)  Drive Price : xxxx   🖬 Configure

SATA Mode
Choose whether to use SATA-E.   ☐ Apply SATA-E

< Back   Next >

181

(a) Computing I/O distribution - I/O characteristics from monitored performance information
(b) Compute I/O Distribution 203 and I/O Characteristics 204

Fig.31

| Media | RAID Level | Random Ratio(%) | Read Ratio(%) | Random Block Size (KB) | Sequential Block Size (KB) | Random Read Hit Ratio(%) | Random Write Hit Ratio(%) | RG Performance (IOPS) | RG Capacity (GB) |
|---|---|---|---|---|---|---|---|---|---|
| SSD (200G) | 6D+2P | 0 | 0 | 1 | 1 | 0 | 0 | 285,496 | 1,200 |
| | 6D+2P | 1 | 0 | 1 | 1 | 0 | 0 | 176,676 | 1,200 |
| | ... | ... | ... | ... | ... | ... | ... | ... | ... |
| | 3D+1P | 0 | 0 | 1 | 1 | 0 | 0 | 142,748 | 600 |
| | 7D+1P | 0 | 0 | 1 | 1 | 0 | 0 | 333,078 | 1,400 |
| | ... | ... | ... | ... | ... | ... | ... | ... | ... |
| SAS (300GB) | 6D+2P | 0 | 0 | 1 | 1 | 0 | 0 | 330,521 | 1,800 |
| | ... | ... | ... | ... | ... | ... | ... | ... | ... |
| ... | | | | | | | | | |

Fig.35
(a) Allocate RG of lower level tier (performance surplus)
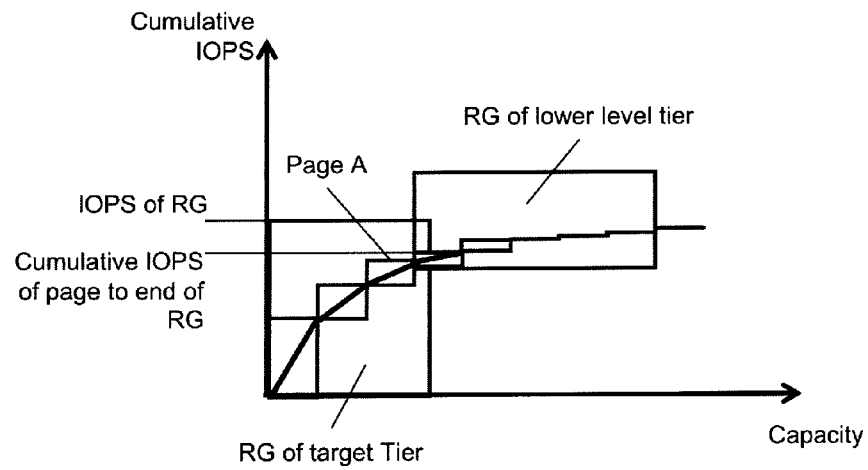
(b) Allocate RG of same tier (performance neck)
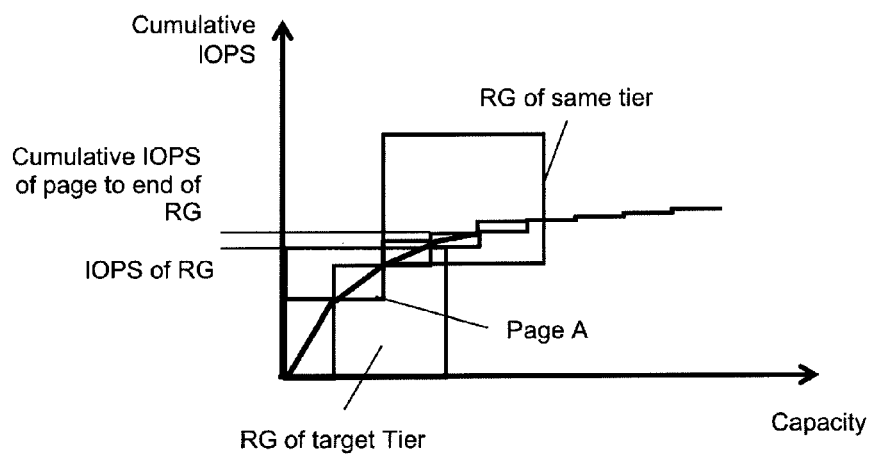

Fig.37

| Detail Configuration | | | |
|---|---|---|---|

| Storage Configuration | |
|---|---|
| Storage Model | xxx |
| Function | xxx |

| Drive Configuration | | | | |
|---|---|---|---|---|
| Pool # | Tier | Drive Type | RG RAID Level | Number of Drives (*) |
| Pool 1 | Tier 1 | SSD-200GB (2.5") | RAID5 (7D+1P) | 136 |
| | Tier 2 | SAS-300GB 10K rpm (2.5") | RAID5 (3D+1P) | 120 |
| | Tier 3 | SAS-2TB 7.2K rpm (3.5") | RAID6 (6D+2P) | 608 |

Fig.38

| Pool Configuration | | |
|---|---|---|
| Pool Capacity (Including Buffer) | Total Capacity (GB) | 882446 |
| | Used Capacity (GB) | 166498 |
| | Free Capacity (GB) | 715936 |
| | % of Used Capacity | 18.87% |
| Actual Usable Performance | Pool Performance (IOPS) | 209174 |
| | Used Performance (IOPS) | 40000 |
| | % of Used IOPS | 21.25% |
| Cost | Pool Storage Relative Cost | 2084.28 |
| | Relative Cost / IOPS | 0.06 |

3801

| Capacity | | | |
|---|---|---|---|
| | Tier 1 | Tier 2 | Tier 3 |
| Drive Type | SSD-200GB (2.5") | SAS-300GB 10K rpm (2.5") | SAS-2TB 7.2K rpm (3.5") |
| Tier Capacity (GB) | 21825 | 24158 | 836465 |
| Used Capacity (GB) | 20889 | 21963 | 123647 |
| Free Capacity (GB) | 931 | 2191 | 712815 |
| % of Used Capacity | 95.72% | 90.92% | 14.79% |
| Tier Capacity Ratio (%) | 2.48% | 2.74% | 94.79% |
| Used Tier Capacity Ratio to Used Pool Capacity (%) | 25.57% | 24.44% | 50.00% |

Capacity Distribution per Workload Type — 3901

| Workload Type | Tier 1 (GB) | Tier 2 (GB) | Tier 3 (GB) |
|---|---|---|---|
| Mail Server | 453 (2%) | 19548 (98%) | 0 (0%) |
| OLTP Database | 20000 (100%) | 0 (0%) | 0 (0%) |
| Rich Content Media | 0 (0%) | 0 (0%) | 20000 (100%) |
| User-Defined Workload Type 1 | 0 (0%) | 0 (0%) | 20000 (100%) |

Capacity Distribution per Tier — 3902

| Workload Type | Tier 1 (GB) | Tier 2 (GB) | Tier 3 (GB) |
|---|---|---|---|
| Mail Server | 453 (2%) | 19548 (100%) | 0 (0%) |
| OLTP Database | 20000 (98%) | 0 (0%) | 0 (0%) |
| Rich Content Media | 0 (0%) | 0 (0%) | 20000 (50%) |
| User-Defined Workload Type 1 | 0 (0%) | 0 (0%) | 20000 (50%) |

Performance — 3903

| | Tier 1 | Tier 2 | Tier 3 |
|---|---|---|---|
| Drive Type | SSD-200GB (2.5") | SAS-300GB 10K rpm (2.5") | SAS-2TB 7.2K rpm (3.5") |
| Performance (Potential) per RG (IOPS) | 10458 | 304 | 294 |
| Performance (Potential) per Tier (IOPS) | 177778 | 9100 | 22297 |
| Performance (Usable) per Tier (IOPS) | 160000 | 8190 | 20067 |
| Used Performance | 11856 | 8145 | 20000 |
| % of Used Performance | 7.41% | 99.46% | 99.67% |
| Tier Performance Ratio (%) | 85.00% | 4.36% | 10.66% |
| Used Tier IOPS Ratio to Used Pool IOPS (%) | 29.64% | 20.37% | 50.00% |

Fig.40

IOPS Distribution per Workload Type — 4001

| Workload Type | Tier 1 | Tier 2 | Tier 3 |
|---|---|---|---|
| Mail Server | 1856 (18%) | 8145 (82%) | 0 (0%) |
| OLTP Database | 10000 (100%) | 0 (0%) | 0 (0%) |
| Rich Content Media | 0 (0%) | 0 (0%) | 10000 (100%) |
| User-Defined Workload Type 1 | 0 (0%) | 0 (0%) | 10000 (100%) |

IOPS Distribution per Tier — 4002

| Workload Type | Tier 1 | Tier 2 | Tier 3 |
|---|---|---|---|
| Mail Server | 1856 (15%) | 8145 (100%) | 0 (0%) |
| OLTP Database | 10000 (85%) | 0 (0%) | 0 (0%) |
| Rich Content Media | 0 (0%) | 0 (0%) | 10000 (50%) |
| User-Defined Workload Type 1 | 0 (0%) | 0 (0%) | 10000 (50%) |

Relative Drive Cost per Tier — 4003

| Pool # | Tier 1 | Tier 2 | Tier 3 |
|---|---|---|---|
| Pool 1 | 1416.77 | 59.51 | 608.00 |

Fig.42
(a) Application A
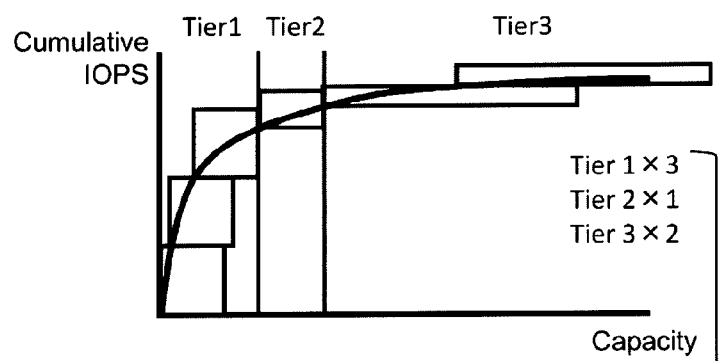
(b) Application B
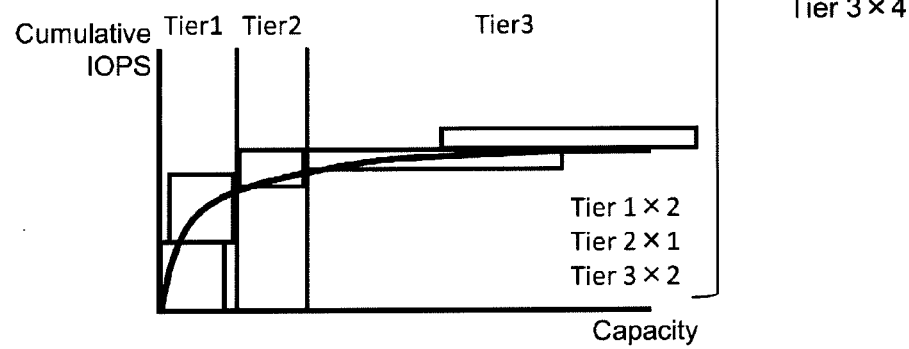

STORAGE SYSTEM, STORAGE CONTROL METHOD AND STORAGE CONTROL PROGRAM

TECHNICAL FIELD

The present invention relates to a storage system, a storage control method and a storage control program.

BACKGROUND ART

A storage subsystem manages a plurality of storage area groups classified according to the attribute of a plurality of storage areas provided by a plurality of storage devices. Further, a technique called thin provisioning or dynamic provisioning is provided, in which at least one storage area included in the plurality of storage areas is allocated according to a write request from a host computer to at least one address included in a plurality of addresses in a virtual volume.

Patent literature 1 discloses an art of providing a plurality of virtual volumes, wherein in accordance with the access condition of at least one address in the logical volume, the data written to the at least one address by the write request is migrated from the at least one storage area included in one of the multiple storage area groups to at least one storage area in another storage area group included in the multiple storage area groups.

CITATION LIST

Patent Literature

PTL 1: United States Patent Application Publication No. 2011/0167236

SUMMARY OF INVENTION

Technical Problem

The data migration technique disclosed in patent literature 1 relates to automatically allocating a page to an appropriate storage media according to the access frequency of a page in page units, which may be referred to as dynamic tiering. A storage subsystem adopting such dynamic tiering technique is called a tiered storage subsystem. Tiered storage subsystems have drawbacks in that the number of storage media is not simply proportional to the performance, therefore it is difficult to design in advance the tier configuration (number of storage media for each performance) capable of satisfying the required performance.

Therefore, the present invention provides a storage subsystem and a storage control method capable of designing in advance the tier configuration capable of satisfying the required performance.

Solution to Problem

In a storage system having a storage subsystem coupled to a management device managing the storage subsystem, the I/O accesses to the storage subsystem are counted by the storage subsystem, and based on the counted results acquired by the management device, a cumulative curve of I/O distribution is created. Then, the management device allocates RAID groups to the storage subsystem in order starting from the RAID group belonging to a higher performance tier based on the created cumulative curve of I/O distribution.

When either a performance limitation value or a maximum capacity of the RAID group exceeds the cumulative curve of I/O distribution, the management device allocates the next RAID group, and the process is repeatedly performed to compute the optimum tier configuration. The management device determines performance or the capacity of the RAID group to be allocated subsequently based on whether the cumulative curve of I/O distribution exceeded the performance limitation value or the maximum capacity of the RAID group.

Advantageous Effects of Invention

By such allocation of RAID groups, the user or the system administrator can design in advance the tier configuration capable of satisfying the required performance.

BRIEF DESCRIPTION OF DRAWINGS

FIG. 7 is a configuration diagram of a virtual volume management table.

FIG. 8 is a configuration diagram of a virtual page management table of the virtual volume.

FIG. 9 is a configuration diagram of a real page management table within a pool.

FIG. 10 is a configuration diagram of a migration page table of a virtual page.

FIG. 16 is a configuration diagram of a screen showing the performance/configuration information.

FIG. 18 is a configuration diagram of a screen for confirming HDD configuration.

FIG. 31 is a configuration diagram of an RG management table managing the relationship between RG performance and RG capacity.

FIG. 35 is a view illustrating the method for allocating RG.

FIG. 37 is a view showing an output image of the result of computing the tier configuration.

FIG. 38 is a view showing an output image of the result of computing the tier configuration.

FIG. 39 is a view showing an output image of the result of computing the tier configuration.

FIG. 40 is a view showing an output image of the result of computing the tier configuration.

FIG. 42 is a view showing a method for computing the tier configuration when multiple applications exist in mixture.

DESCRIPTION OF EMBODIMENTS

Figure 1:
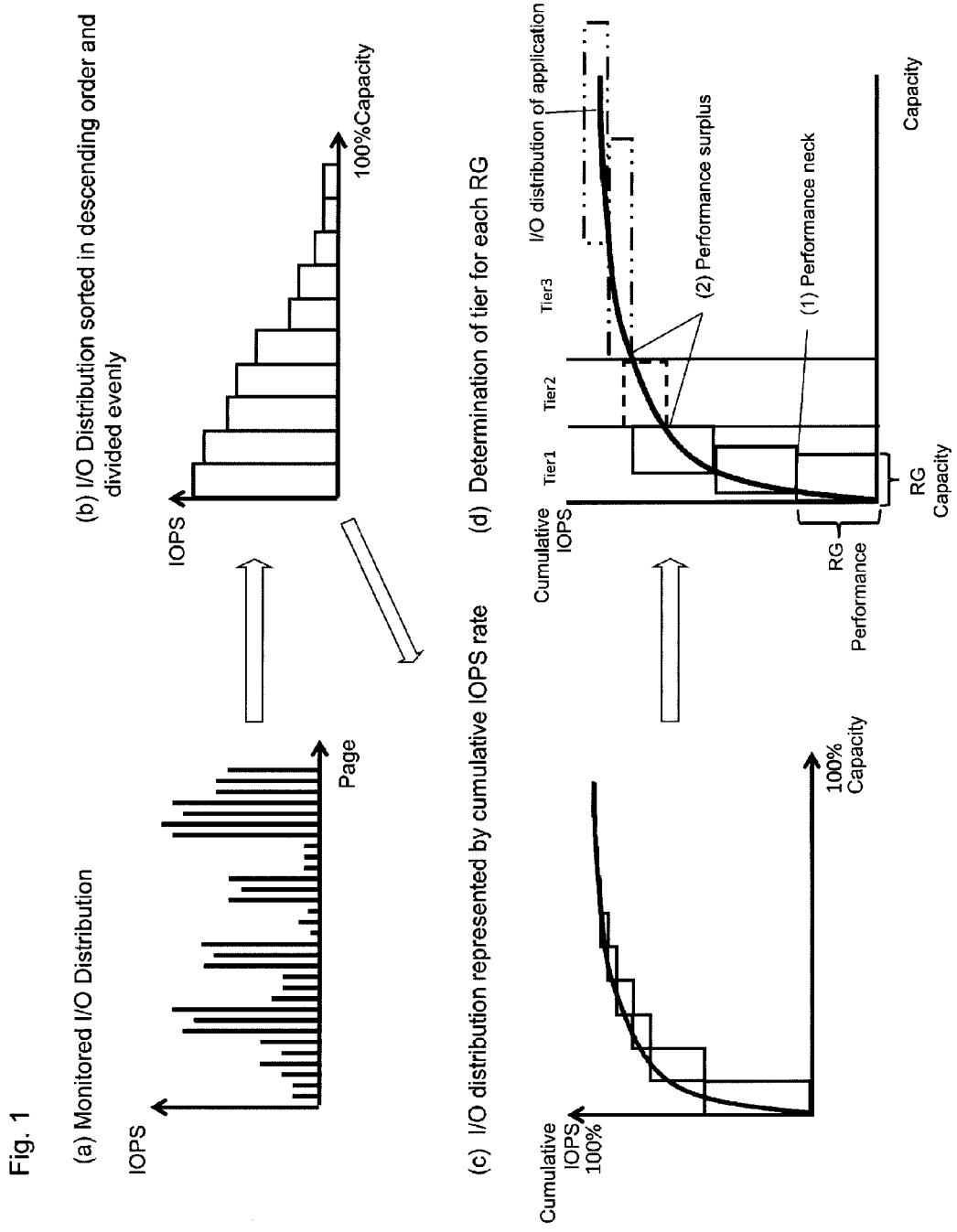
FIG. 1 is a conceptual diagram illustrating an outline of the present invention.

Now, the preferred embodiments of the present invention will be described with reference to the drawings. In the following description, various information are referred to as "management table" and the like, but the various information can also be expressed by data structures other than tables. Further, the "management table" can also be referred to as "management information" to show that the information does not depend on the data structure.

The processes are sometimes described using the term "program" or "tool" as the subject. The program or tool is executed by a processor such as an MP (Micro Processor) or a CPU (Central Processing Unit) for performing determined processes. A processor can also be the subject of the processes since the processes are performed using appropriate storage resources (such as memories) and communication interface devices (such as communication ports). The processor can also use dedicated hardware in addition to the CPU. The computer program can be installed to each computer from a program source. The program source can be provided via a program distribution server or storage media, for example.

Each element, such as each LU (Logical Unit), can be identified via numbers, but other types of identification information such as names can be used as long as they are identifiable information. The equivalent elements are denoted with the same reference numbers in the drawings and the description of the present invention, but the present invention is not restricted by the present embodiments, and other modified examples in conformity with the idea of the present invention are included in the technical range of the present invention. The number of the components can be one or more than one unless defined otherwise.

<<Outline of the Invention>>

FIG. 1 is a conceptual diagram showing the outline of the present invention.

The present invention is for computing a tier configuration satisfying the required performance by executing the following steps (a) to (d) in a storage system. The subject of the computing process is assumed to be the CPU of the management device and the MP of the storage subsystem, but the process can be performed by either one, or can be performed in shred manner different from that described in the following paragraphs (a) to (d).

(a) Creating a Monitored I/O Distribution

The number of I/O accesses per storage area (virtual page or real page) divided into given units used by the application that the host operates in the storage subsystem is counted by the MP of the storage subsystem. The CPU of the management device acquires the measurement result, and creates an "I/O distribution graph of page number—IOPS" setting the counted page number on the horizontal axis and the counted number of I/O accesses (IOPS: IOPer Second) on the vertical axis. For example, it is assumed that the CPU of the management device acquires a number of I/O accesses corresponding to 100 pages.

(b) Creating I/O Distribution Graph Sorted in Descending Order and Divided Evenly Next, the CPU sorts the pages in order from the page having greater IOPS to the page having smaller IOPS using the created I/O distribution graph. The CPU assembles the horizontal axis via given page number units in the sorted I/O distribution graph. For example, the pages are assembled in units of 10 pages, and the horizontal axis is equally divided into 10 sections, each section corresponding to 10%. The CPU computes the sum of the IOPS for each assembled page, and the sum is shown in the vertical axis. The CPU creates an "I/O distribution graph of capacity (%)–IOPS" having horizontal and vertical axes obtained as described above.

(c) Creating an I/O Distribution Graph Represented by Cumulative IOPS

Next, the CPU creates a cumulative curve of I/O distribution (cumulative curve of I/O distribution graph of capacity (%)–cumulative IOPS (%)) in which the vertical axis of the "I/O distribution graph of capacity (%)–IOPS" created in (b) is represented by a ratio with respect to the cumulative IOPS.

(d) Determining Tiers for Each RG

Next, the CPU creates a cumulative curve of I/O distribution in which the horizontal axis of the "cumulative curve of I/O distribution graph of capacity (%)–cumulative IOPS (%)" created in (c) is converted to the actual cumulative storage capacity and the vertical axis is converted to actual cumulative IOPS. Next, the CPU allocates RAID groups (RG) in order starting from the group belonging to a higher performance tier to the cumulative curve of I/O distribution. Then, when the cumulative curve of I/O distribution exceeds either the performance limitation value or the maximum capacity of the RG, the CPU determines the performance of the RG to be allocated subsequently, and the determined RG is allocated.

The CPU repeats the above processes to compute the optimum tier configuration (combination of RGs) preferable for each application. Actually, a rectangular box representing each RG is arranged in order from the RG belonging to the tier having higher performance to the cumulative curve of I/O distribution from the point of origin of the cumulative curve of I/O distribution. The length of the vertical side of the box represents the performance limitation value of the RG, and the length of the horizontal side of the box represents the maximum capacity of the RG. When the cumulative curve of I/O distribution crosses with the horizontal line of the box, it shows that more RGs are required due to performance neck, so that the box representing the RG belonging to the same tier is allocated from the crossing point. When the cumulative curve of I/O distribution crosses with the vertical line of the box, it shows that more RGs are required due to lack of capacity but the performance is excessive, so that a box representing an RG belonging to a lower level tier is allocated from the crossing point. In this manner, the optimum tier configuration is computed by the types and numbers of boxes covering the cumulative curve of I/O distribution.

<<Storage System Configuration>>

Figure 2:
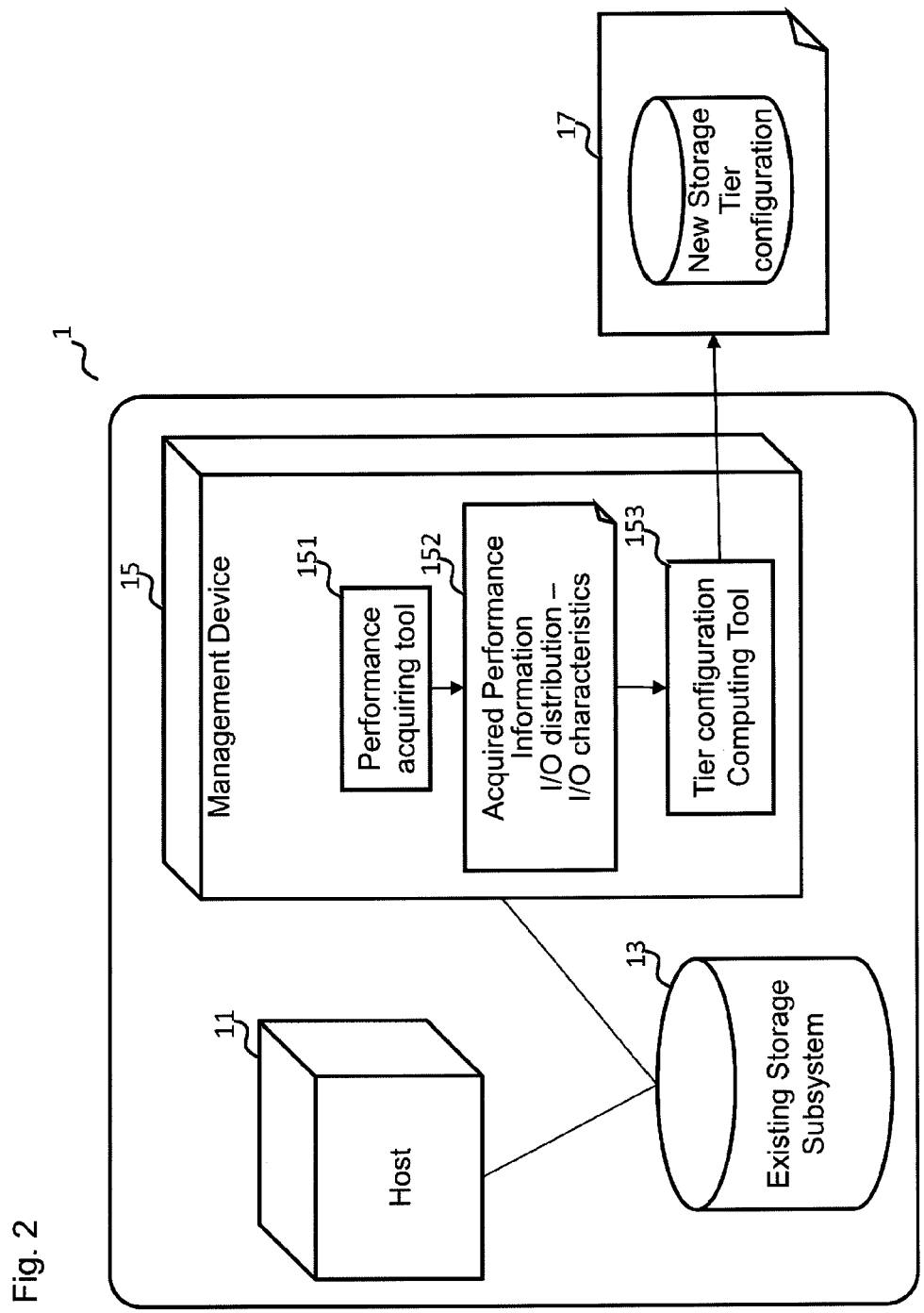
FIG. 2 is an overall configuration diagram of the storage system.

FIG. 2 is an overall configuration diagram of the storage system. A storage system 1 is composed of a host computer (hereinafter referred to as host) 11, an existing storage subsystem 13, and a management device 15. The management device 15 includes a performance acquiring tool 151 and a tier configuration and a tier configuration computing tool 153 according to the present invention, wherein the I/O distribution and I/O characteristics 152 is computed using the performance information acquired via the performance acquiring tool 151. Then, the tier configuration computing tool 153 uses the computed I/O distribution and I/O characteristics 152 to compute the tier configuration of the newly introduced storage subsystem (hereinafter referred to as new storage subsystem) 17. The details will be described later.

The management device 15 is a management server or the like, but it can also be substituted by a PC (Personal Computer) or a multifunction portable terminal. Further, the tier configuration computing tool can be disposed in a separate device for use, which can be used as a dedicated tier configuration computing device.

<<Hardware Configuration of Storage Subsystem>>

Figure 3:
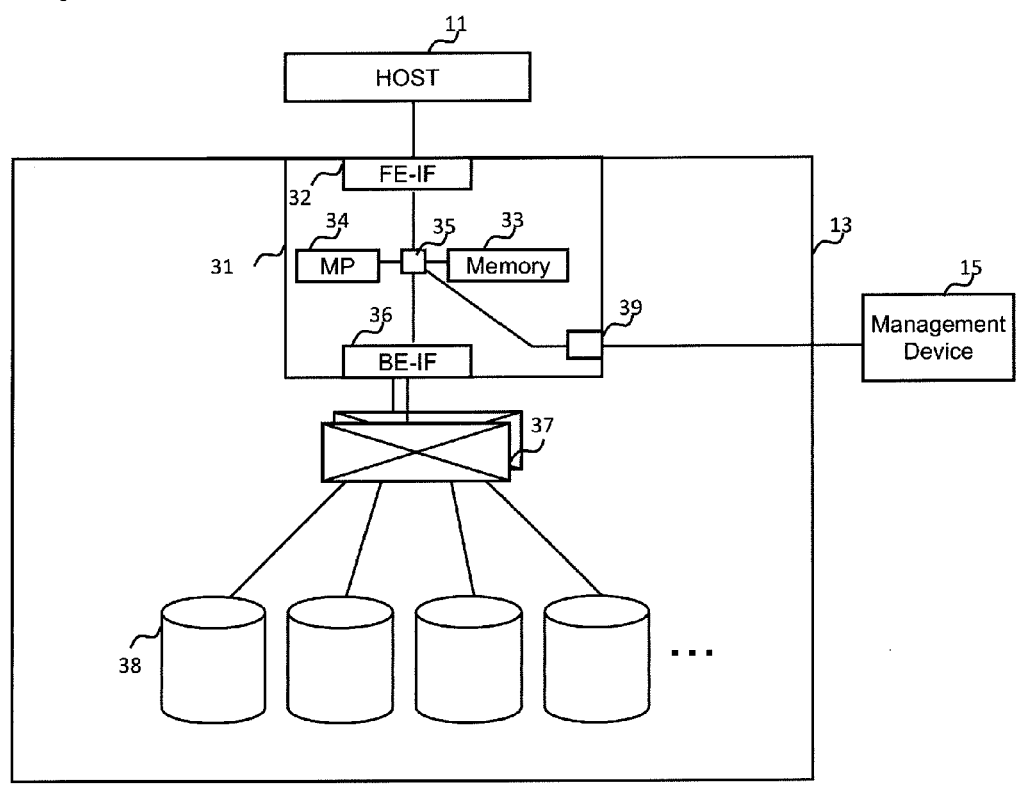
FIG. 3 is a hardware configuration diagram of the storage subsystem.

FIG. 3 is a hardware configuration diagram of a storage subsystem. The existing storage subsystem 13 is composed of a plurality of physical storage devices (PDEV) 38, and a storage controller (Disk Controller, hereinafter referred to as DKC) 31 coupled to the plurality of PDEVs 38 via a backend connection device 37.

The plurality of PDEVs 38 includes multiple varieties of memory drives, such as an SSD (Solid State Drive) and an HDD (Hard Disk Drive).

The types of HDD include an FC (Fiber Channel) type, an SAS (Serial Attached SCSI) type or a SATA (Serial ATA) type.

The DKC 31 is composed of a front end interface (hereinafter referred to as FE-IF) 32, a memory 33, an MP (Micro Processor) 34, a backend interface (hereinafter referred to as BE-IF) 36, a port 39 and a data transfer circuit 35 connecting the same.

The FE-IF 32 is a controller for coupling the host 11 and the existing storage subsystem 13 via a specific communication protocol. Typical communication protocols include a SAN (Storage Area Network), an NFS (Network File System) or a CIFS (Common Internet File System). The FE-IF 32 receives an I/O command (write command or read command) from the host 11, and transfers the received I/O command to the MP 34.

The memory 33 can have a volatile memory and/or a non-volatile memory. The memory 33 has a storage area in which the data element being the target of I/O is temporarily stored, and a storage area storing device control programs and device control information.

The MP 34 processes an I/O command from the PE-IF 32.

The BE-IF 36 is a controller for coupling the DKC 31 and the PDEV 38 via a backend connection device 37. The BE-IF 36 reads data from the PDEV 38 and transfers the same to the memory 33, or writes the data from the memory 33 into the PDEV 38.

The port 39 is for coupling the existing storage subsystem 13 to the management device 15.

The management device 15 is a computer having an output device such as a display device and an input device such as a keyboard. An administrator can determine various settings of the existing storage subsystem 13 from the management device 15.

Further, there is only one host 11, one management device 15, one DKC 31 and one component thereof illustrated in the drawing, but the number thereof can be two or more. The configuration of the new storage subsystem 17 being newly introduced is similar to that of the existing storage subsystem 13. It is also possible that the new storage subsystem 17 has a different configuration as that of the existing storage subsystem 13.

<<Hardware Configuration of Host/Management Device>>

Figure 4:
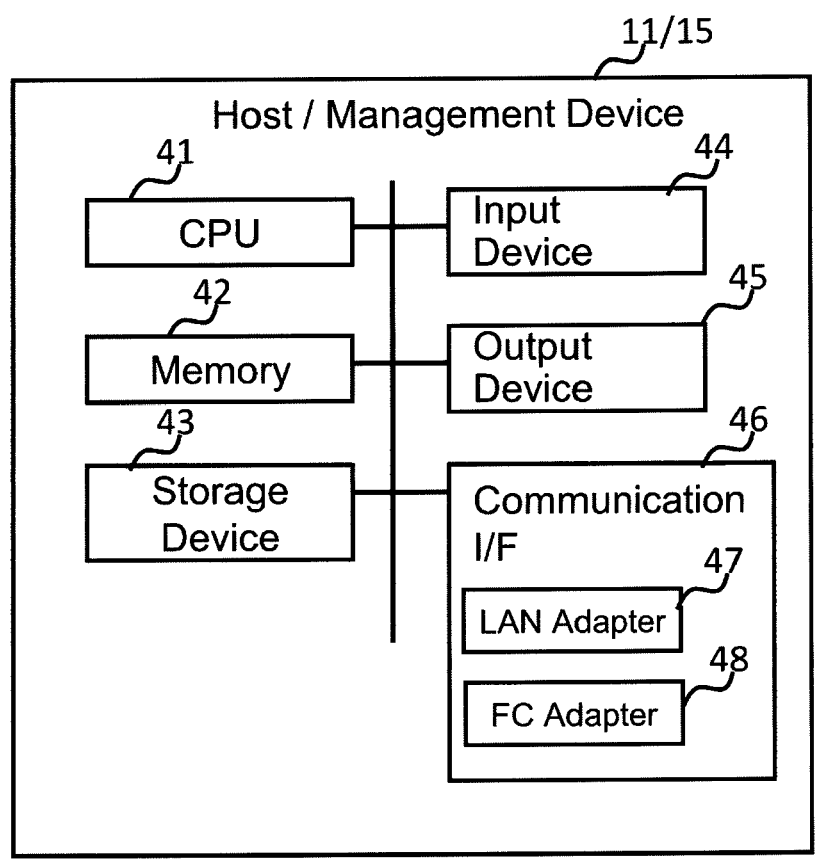
FIG. 4 is a hardware configuration diagram of the host and the management device.

FIG. 4 is a hardware configuration diagram of a host and a management device. The host 11 and management device 15 is composed of a CPU (Central Processing Unit) 41, a memory 42, a storage device 43, an input device 44, an output device 45, and a communication I/F 46.

The CPU 41 controls the whole host 11 or management device 15.

The memory 42 has a volatile memory and/or a nonvolatile memory, and stores programs, various data and device control information used by the host 11 or the management device 15. Further, the CPU 41 executes the performance acquiring tool 151 and the tier configuration computing tool 153 stored in the memory 42, so as to compute the optimum tier configuration.

The storage device 43 is composed of a plurality of non-volatile memory drives such as HDDs. The storage device 43 of the management device 15 stores the performance acquiring tool 151 and the tier configuration computing tool 153, which are read into the memory 42 via the CPU 41 and executed by the CPU 41 arbitrarily.

The input device 44 is a means such as a keyboard or a mouse for entering data and information to the host 11 or the management device 15.

The output device 45 is a means such as a display device or a printer for outputting the result of computation performed by the host 11 or the management device 15, the device information and so on.

<Logical Configuration of System>

Figure 5:
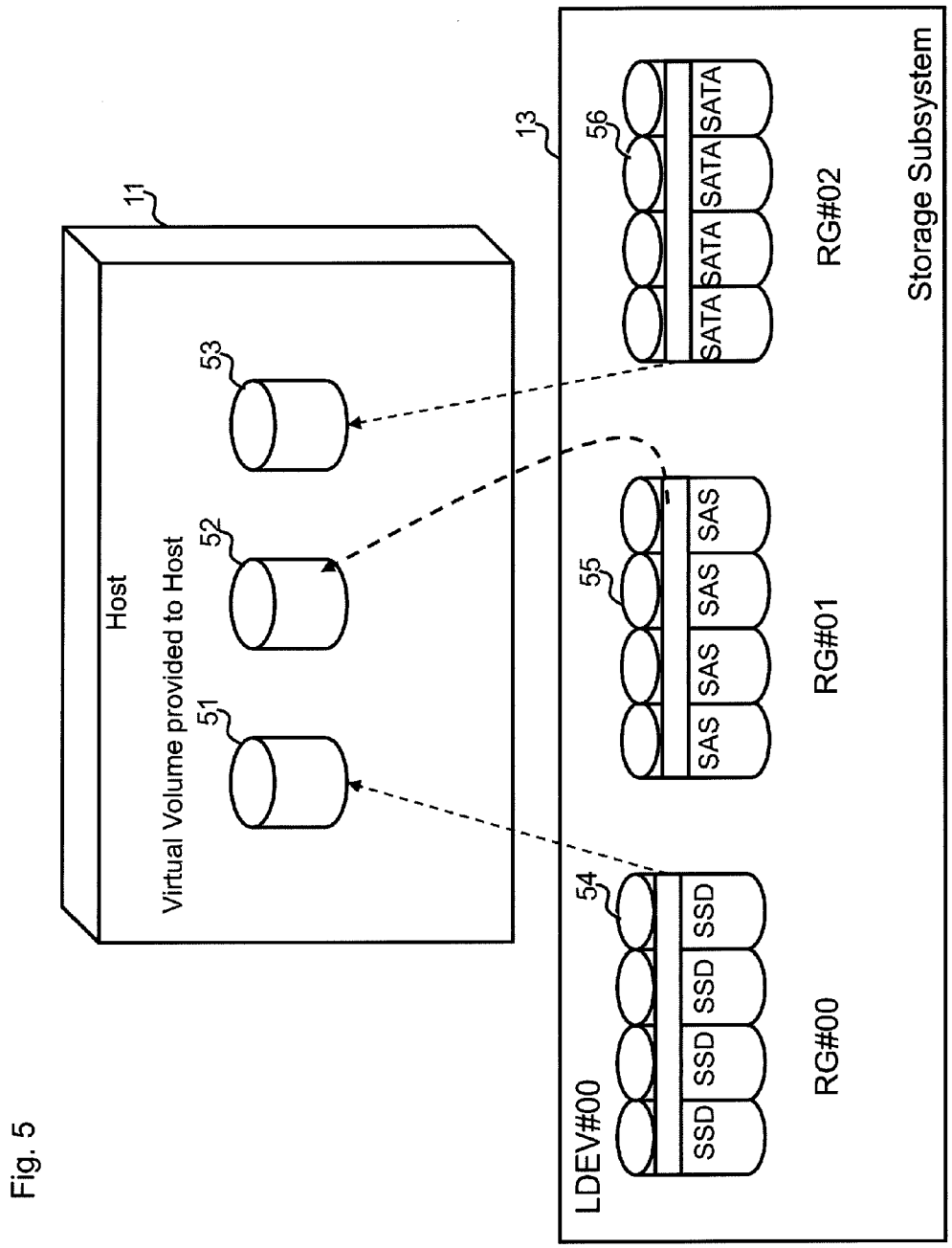
FIG. 5 is a view showing the relationship between virtual volume and logical device.

FIG. 5 is a view showing the relationship between a virtual volume and a logical device. Logical devices (LDEV) are composed within the existing storage subsystem 13 to correspond to each RG, which are provided as virtual volumes to each host 11. For example, LDEV #00 which is an RG #00 composed of SSD is provided as virtual volume 51 to the host 11.

<Relationship between Various Storage Areas>

Figure 6:
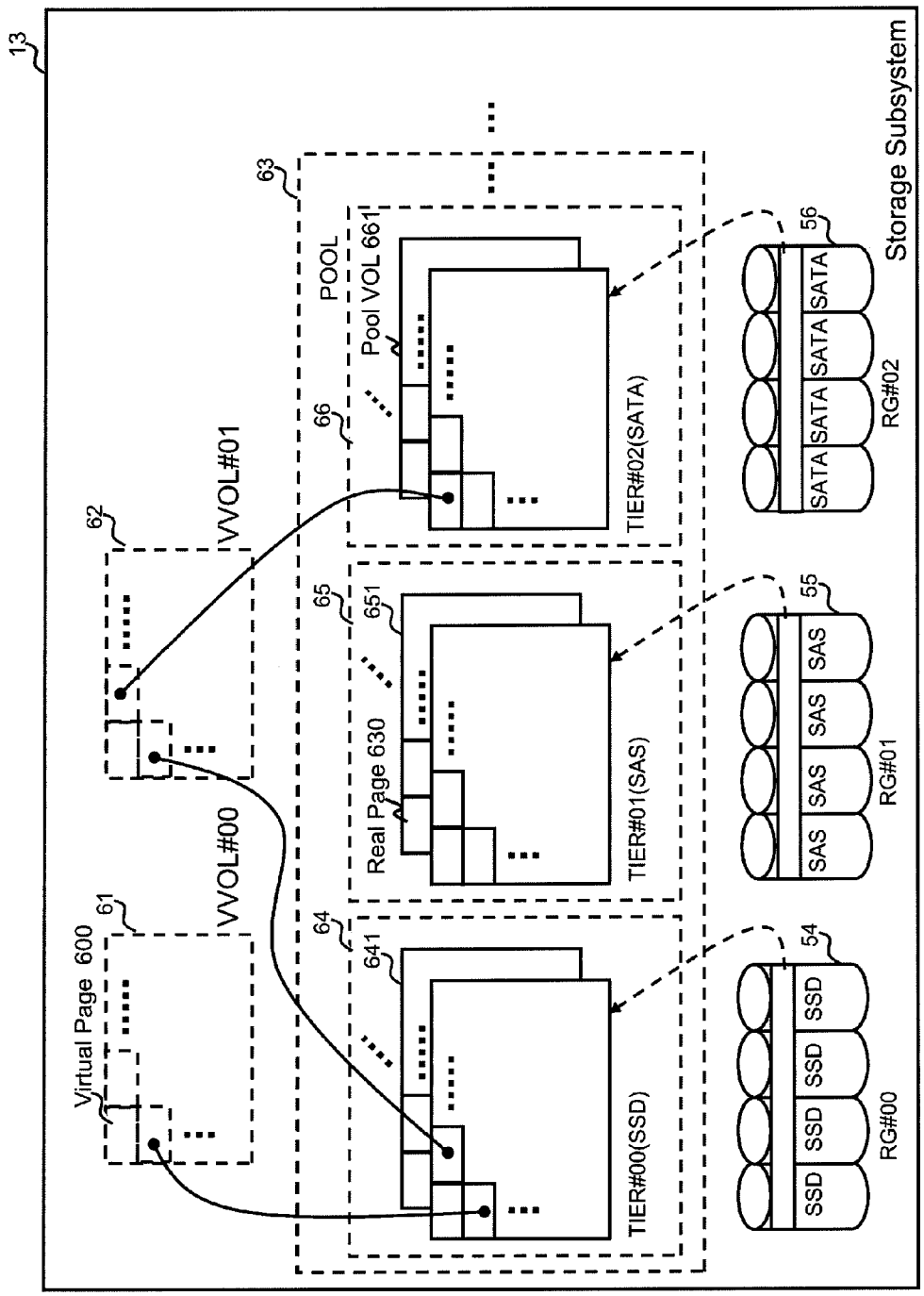
FIG. 6 is a view showing the relationship among various storage areas in the storage subsystem.

FIG. 6 is a view showing the relationship between various storage areas within the storage subsystem. As shown in FIG. 6, the existing storage subsystem 13 manages, from the lower level to the upper level, one or more RGs 54, 55, and 56, one or more pools 63, and one or more virtual volumes (VVOL) 61 and 62.

One RG is composed of the same type of PDEVs. The PDEV type is defined for example by at least either performance or unit cost. Performance refers for example to the I/O data speed, or the response time (length of time from when a command is received from the host to returning a response thereto). Unit cost refers to the cost required to save a unit-size data (such as a so-called bit cost, for example).

For example, the RG #00 is composed of a plurality of SSDs, RG #01 is composed of a plurality of SAS type HDDs, and RG #02 is composed of a plurality of SATA type HDDs. For example, the capacity of each of the plurality of PDEVs constituting a single RG is, for example, 2 TB in a SATA type HDD.

A pool 63 is a set of real pages 630. Actually, for example, the pool 63 is composed of one or more pool volumes (PVOL) 641, 651 and 661. Each PVOL is composed of one or more real pages 630.

The real pages 630 constituting a single pool 63 are divided into tiers. In other words, multiple tiers 64, 65 and 66 exist within a single pool 63. The tiers are a tier #00 (SSD) 64 composed of SSD 54, a tier #01 (SAS) 65 composed of SAS 55, and a tier #02 (SATA) 66 composed of SATA 56.

For example, tiers 64, 65 and 66 exist in correspondence to each type of PVOL. Therefore, the type of the PVOL corresponding to a tier belongs to a single tier.

Actually, for example, tier #00 corresponds to SSD, so that PVOL 641 formed of RG 54 composed of SSD belongs thereto. Similarly, tier #01 corresponds to SAS type HDD, so that PVOL 651 formed of RG 55 composed of SAS type HDD belongs thereto. Similarly, tier #03 corresponds to SATA type HDD, so that PVOL 661 formed of RG 56 composed of SATA type HDD belongs thereto.

Further, tiers are not necessarily provided to strictly correspond to each PVOL type, and it is possible that multiple PVOLs formed of RGs of similar types belong to the same tier.

VVOLs 61 and 62 each have an allocation source pool 63 associated therewith from the one or more pools. Moreover, VVOLs 61 and 62 each have a tier associated thereto from the selected pool usable as allocation source.

A real page is allocated to the virtual page of the VVOL when a data is written from the host 11 into the existing storage subsystem 13, that is, to the VVOL.

<<Management Table>>

<Virtual Volume Management Table>

FIG. 7 is a configuration diagram of a virtual volume management table. The virtual volume management table 70 is stored in the memory 33 of the storage subsystem 13.

The virtual volume management table 70 is composed of a VVOL_ID 701, a POOL_ID 702, and an application 703 being stored. For example, a pool having "00" as the POOL_ID 702 is allocated to the VVOL having "00" set as VVOL_ID 701, and an application having "Mail Server" as the application name 703 is stored in that pool.

Based on the virtual volume management table 70, it is possible to recognize in which VVOL or which pool a certain application is located.

<Virtual Page Management Table>

FIG. 8 is a configuration diagram of a virtual page management table of a virtual volume. The virtual page management table 80 is stored in the memory 33 of the storage subsystem 13.

A virtual page management table 80 exists in each VVOL. The virtual page management table 80 is a table showing the allocation of real pages to virtual pages, and the I/O frequency of the real pages. The virtual page management table 80 will now be described taking one VVOL (hereinafter referred to as "target VVOL" in the description of FIG. 8) as an example.

The virtual page management table 80 stores, corresponding to each virtual page, a VVOL_ID 801, a virtual page ID 802, an I/O count per I/O type 81, a total I/O count 803, an average I/O count 804, a maximum I/O count 805, and a final I/O time 806.

The information elements of a single virtual page (hereinafter referred to as "target virtual page" in the description of FIG. 8) are as follows:

(1) "VVOL_ID" is an ID of the VVOL having the target virtual page (target VVOL).

(2) "Virtual page ID" refers to the ID of the target virtual page.

(3) "Total I/O count" is the total of the number of I/O performed to the target virtual page within a monitored time zone.

(4) "Average I/O count" is a value computed by dividing the "total I/O count" within the monitored time zone by the monitored time.

(5) "Maximum I/O count" is the greatest I/O count within multiple I/O counts (I/O counts of the target virtual page) within multiple monitored time zones.

(6) "Final I/O time" is the latest time of I/O performed to the target virtual page.

Further, the I/O count per I/O type 81 stores the information related to the I/O count and the data transfer quantity, which are a Random Read I/O 811, a Random Write I/O 812, a Sequential Read I/O 813, a Sequential Write I/O 814, a Random Read Hit 815, a Random Write Hit 816, a Random KB Transfer 817, and a Sequential KB Transfer 818.

As for the actual relationship between the VVOL and the virtual page, for example, a plurality of virtual pages having page IDs 802 "00000", "00001" . . . are allocated to VVOL #00 in which the VVOL_ID 801 is "00".

The virtual page in which the virtual page ID 802 is "00000" has a total I/O count 803 of "1000" (Random Read I/O 811 and Random Write I/O 812 are each "500"), an average I/O count 804 of "100", a maximum I/O count 805 of "200" and a final I/O time 806 of "17:00".

As for VVOL #01 in which the VVOL_ID 801 is "01", real pages are not yet allocated to virtual pages having virtual page IDs 802 of "00000" and "00001", so that there are no information on the I/O count per I/O type 81, the total I/O count 803 and so on.

For example, there can be two (or more than two) virtual page management tables 80, and the two virtual page management tables 80 can be used alternately.

For example, when reallocation of pages is to be performed, a migration page table 100 (FIG. 10) mentioned later is created using the virtual page management table 80 regarding the monitored time zone closest to the execution time, and the other virtual page management table 80 is used to monitor the I/O frequency. In the following description, the virtual page management table 80 being used may be referred to as an active virtual page management table 80, whereas the virtual page management table 80 not being used may be referred to as a standby virtual page management table 80.

<Real Page Management Table within Pool>

FIG. 9 is a configuration diagram of a real page management table within the pool. The real page management table 90 is stored in the memory 33 of the storage subsystem 13. The real page management table 90 is a table for managing which real pages are allocatable, and the table is composed of a POOL_ID 901, a real page ID 902, a virtual page ID 802, a VVOL_ID 801, a TIER_ID 903, an LDEV_ID 904, an RG_ID 905, and a RAID_Level 906.

In other words, the virtual volume, the tier, the logical device, the RAID group and the RAID level of each real page of each pool is managed via the real page management table 90.

Actually, for example, the real page in which the POOL_ID 901 is "00" and the real page ID 902 is "00001" is allocated to a virtual page in which the VVOL_ID 801 is "00" and the virtual page ID 802 is "00000". Then, the real page is managed, for example, by setting the TIER_ID 903, the LDEV_ID 904 and the RG_ID 905 to "01" and the RAID_Level 906 to "6D+2P".

Further, the real page having the POOL_ID 901 of "00" and the real page ID 902 of "00100" is not allocated to a virtual page (unallocated state). Therefore, no management information is stored in the virtual page ID 802 and the like.

<Migration Page Table>

FIG. 10 is a configuration diagram of a migration page table of a virtual page. The migration page table 100 is stored in the memory of the storage subsystem 13.

A migration page table 100 is a table created based on the page management table 80 when performing data migration in page units. The migration page table 100 shows the relationship between migration source and migration destination, and the migration status.

For example, the migration page table 100 has, for each virtual page of the migration target, a virtual page ID 1001, a migration source TIER_ID 1002, a migration destination TIER_ID 1003 and a migration STATUS 1004.

The actual information elements are as follows, taking a single virtual page (hereinafter referred to as "target virtual page" in the description of FIG. 10) as an example:

(1) "Virtual page ID" refers to the ID of the target virtual page.

(2) "Migration source TIER_ID" refers to the ID of a tier having the real page (real page of the migration source) allocated to the target virtual page.

(3) "Migration destination TIER_ID" refers to the ID of a tier being the migration destination of the data element. The real page of the migration destination is a free (unallocated status) real page in the tier.

(4) "Migration status" refers to the status of migration of the target virtual page.

For example, the values of the "migration status" can be "migrated", "during migration" and "not migrated". "Migrated" refers to a state where data element is already migrated from the real page of the migration source to any one of the real pages in the migration destination tier.

"During migration" refers to a state where data element is being migrated from the real page of the migration source to one of the real pages in the migration destination tier. "Not migrated" refers to a state where migration of data element from the real page of the migration source to any one of the real pages in the migration destination tier is not yet started.

<Processing Operation>
<Write I/O>

Figure 11:
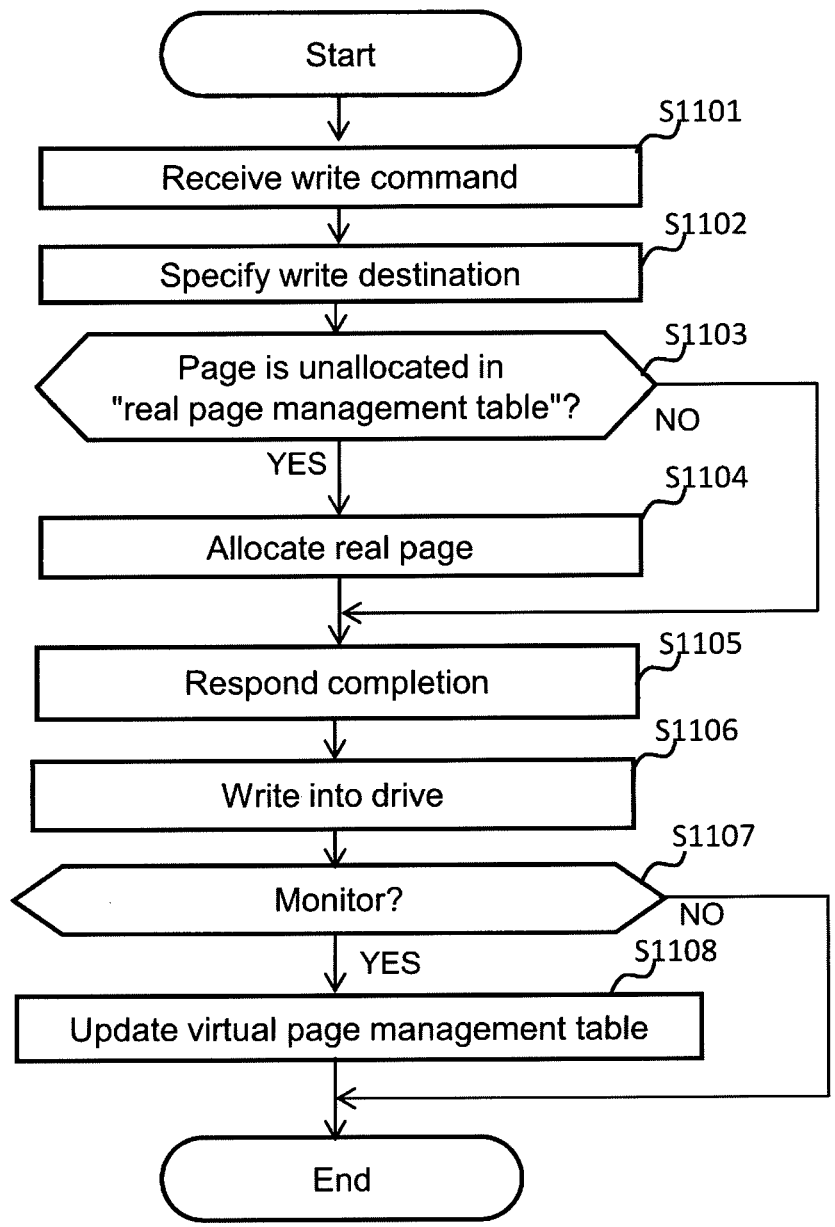
FIG. 11 is a flowchart of processing a write I/O access.

FIG. 11 is a flowchart of a write I/O access processing.

In S1101, the MP 34 receives a write I/O command from the host 11.

In S1102, the MP 34 specifies the write destination from the write I/O command.

In S1103, the MP 34 determines based on the real page management table 90 whether a real page is unallocated to the real page of the write destination virtual page or not. If a real page is unallocated (S1103: Yes), the MP 34 allocates a real page to the write destination virtual page in S1104, and updates the real page management table 90. That is, the MP 34 stores information such as the virtual page number, the VVOL number, the tier level and the like in the field of the real page ID 902 corresponding to the allocated real page.

In S1105, the MP 34 writes the write data into the memory 33, and responds write complete to the host 11.

In S1106, the MP 34 (or the BE-IF 36) performs destaging, that is, executes a process to read the write data written into the memory 33 and write the same into the physical storage device (PDEV) 38.

In S1107, the MP 34 determines whether the write destination virtual page is a target for monitoring the I/O access information or not.

If the write destination virtual page is not a monitor target (S1107: No), the MP 34 ends the write I/O access processing.

If the page is a monitor target (S1107: Yes), the MP 34 updates the I/O count per I/O type 81, the total I/O count 803, the final I/O time 806 and the like of the virtual page management table 80 (such as by incrementing the Random Write I/O 812 and replacing the final I/O time 806 with the current time) in S1108, and ends the write I/O access processing.

<Read I/O>

Figure 12:
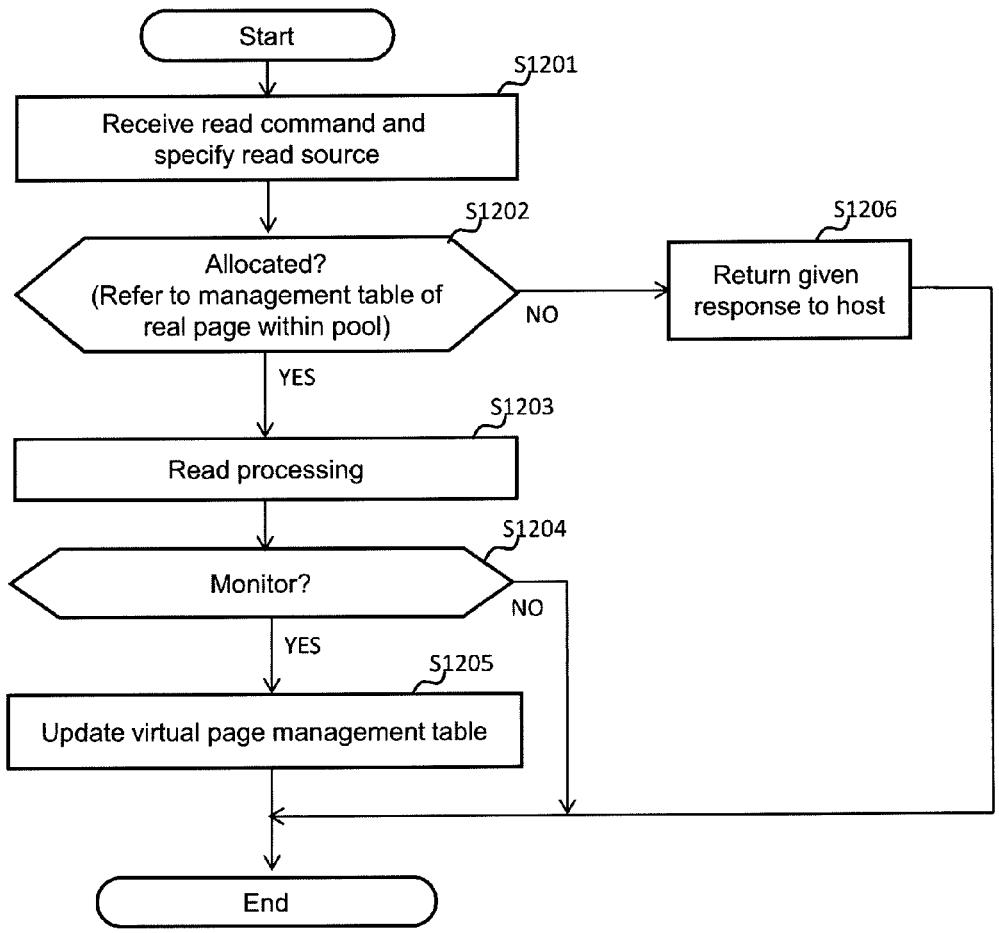
FIG. 12 is a flowchart of processing a read I/O access.

FIG. 12 is a flowchart of a read I/O access processing.

In S1201, the MP 34 receives a read I/O command from the host 11, and specifies the read source in the read I/O command.

In S1202, the MP 34 determines based on the real page management table 90 whether a real page is already allocated to the virtual page of the read destination. If a real page is unallocated (S1202: No), the MP 34 sends a given response (such as returning 0 data) to the host 11.

If a real page is allocated (S1202: Yes), the MP 34 executes a read process to read the data stored in the real page of the read destination (address designated by the read I/O command) in S1203.

In S1204, the MP 34 determines whether the read destination virtual page is a target for monitoring the I/O access information or not.

If the page is not a monitor target (S1204: No), the MP 34 ends the read I/O access processing.

If the page is a monitor target (S1204: Yes), the MP 34 updates the I/O count per I/O type 81, the total I/O count 803, the final I/O time 806 and the like of the virtual page management table 80 (such as by incrementing the I/O count 803 and replacing the final I/O time 806 with the current time) in S1205, and ends the read I/O access processing. In the processes of FIG. 11 and FIG. 12, the storage subsystem can manage the I/O type and the number of accesses per page or per volume.

<Migration Processing>
<Relocation Processing>

Figure 13A:
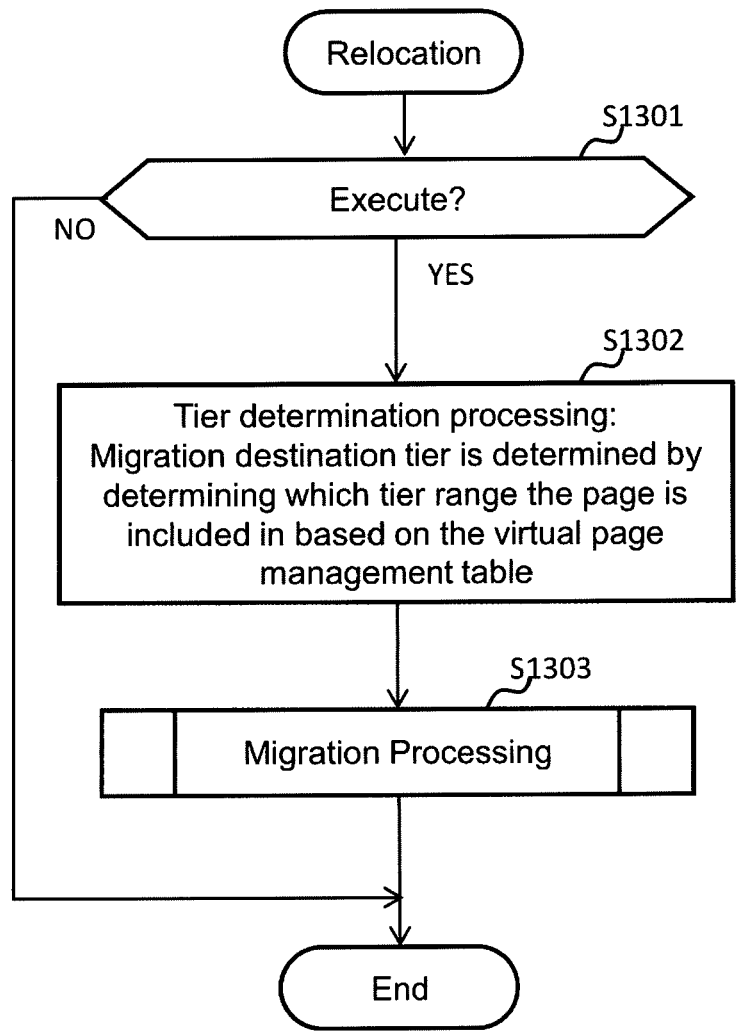
FIG. 13A is a flowchart showing a relocation processing in an inter-page migration processing.

FIG. 13A is a flowchart of a data relocation processing in inter-page migration processing. This data relocation processing in inter-page migration processing is a function called dynamic tiering, which is a process for changing the tier level of the real page being allocated based on the I/O frequency of the real page and migrating data thereto. For example, a high performance tier level (upper level tier) is allocated to the page having a high I/O frequency, and a lower level tier is allocated to the page having a low I/O frequency. The present data relocation processing can be performed when a usage rate of a specific tier exceeds a threshold, or can be performed periodically.

In S1301, the MP 34 determines whether to execute relocation or not. For example, when the existing storage subsystem 13 receives a command to migrate data of a target virtual page from the system administrator via the management device 15, relocation is executed. If the existing storage subsystem 13 is set so as not to perform relocation, data migration will not be performed.

If it is determined that relocation should not be executed (S1301: No), the MP 34 ends the data relocation processing in the inter-page migration processing.

When it is determined that relocation should be performed (S1301: Yes), the MP 34 executes a tier determination processing in S1302. Actually, the migration destination tier is decided by determining the tier range (TIER_ID) in which the virtual page is included based on the information in the virtual page management table 80 (average I/O count 804 and the like). The MP 34 updates the migration page table 100 based on the determined migration destination tier.

As a method for determining the migration destination tier, for example, it is possible to prepare multiple types of tier ranges in advance, and the MP 34 can select an arbitrary tier range for each tier from the multiple types of tier ranges.

In S1303, the MP 34 executes migration processing in page units according to the updated migration page table 100. In page-unit data migration, data is migrated from a real page within a certain tier to a real page of a different tier within the target pool.

<Data Migration Processing>

Figure 13B:
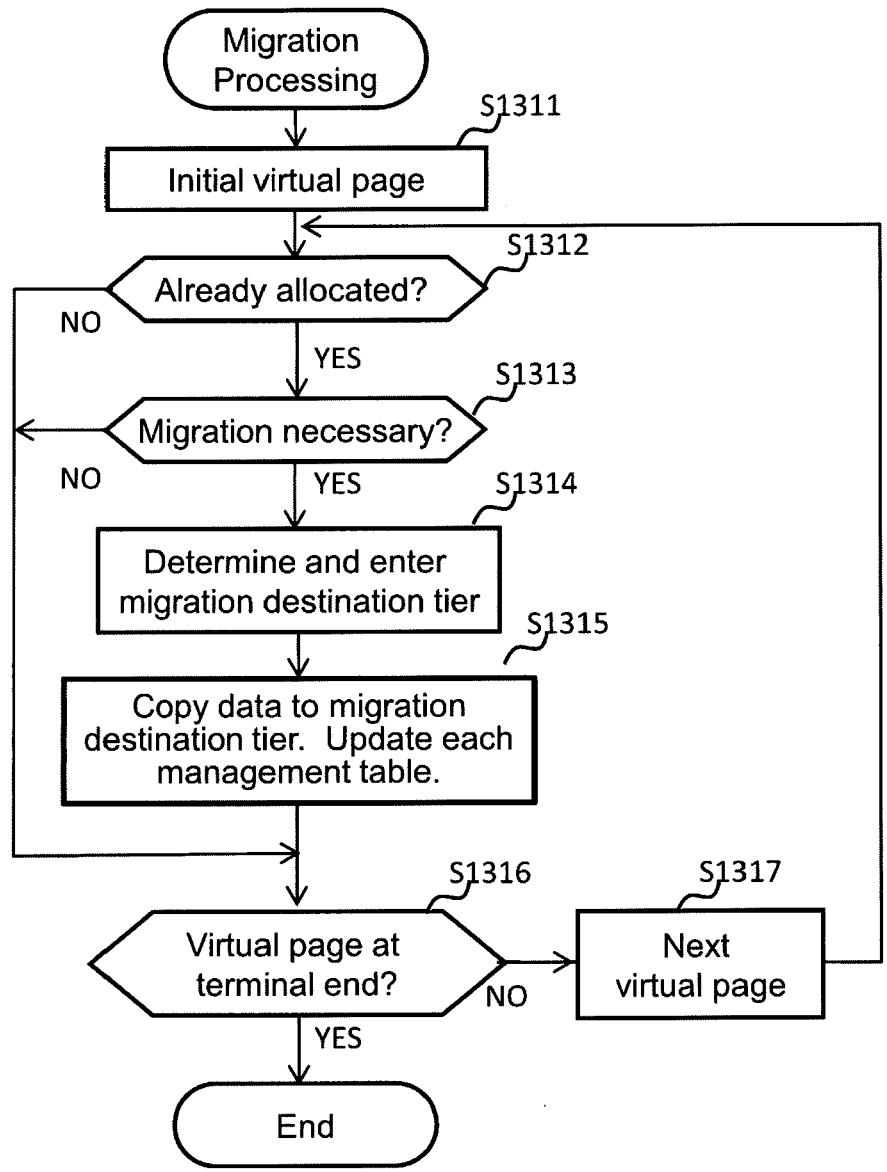
FIG. 13B is a flowchart showing a data migration processing in an inter-page migration processing.

FIG. 13B is a flowchart of data migration processing in inter-page migration processing.

In S1311, the MP 34 selects an initial virtual page (target virtual page) of VVOL (target VVOL) which is the target of the data migration processing.

In S1312, the MP 34 determines whether a real page is allocated to the target virtual page or not based on the real page management table 90. In other words, the MP determines whether the ID of the target virtual page is stored in the real page management table 90 or not.

If a real page is not allocated to the target virtual page (S1312: No), the MP 334 executes S1316.

If a real page is allocated to the target virtual page (S1312: Yes), the MP 34 executes S1313.

In S1313, the MP 34 determines based on the migration page table 100 whether the tier in which the data of the real page allocated to the target virtual page should be changed or not. The determination processing is shown in the following paragraphs (1) through (3).

(1) The MP 34 specifies the target tier having the real page allocated to the target virtual page (migration source tier) from the real page management table 90.

(2) The MP 34 compares the I/O frequency of the target virtual page (such as at least one of the I/O count per I/O type 81, the total I/O count 803, the average I/O count 804 and the maximum I/O count 805 shown in the active virtual page management table 80 (FIG. 8) corresponding to the target VVOL) and the tier range threshold corresponding to the migration source tier (I/O frequency range).

(3) The MP 34 determines based on the comparison result whether to migrate the data within the real page allocated to the target virtual page from the migration source tier to a different (migration destination) tier or not.

For example, if the I/O frequency does not fall within the tier range threshold of the target virtual page, it means that in processing I/O accesses, the access performance of the tier is either excessive or insufficient, so the MP 34 determines that the tier should be changed and data should be migrated thereto.

In S1314, the MP 34 determines the tier corresponding to the tier range in which the I/O frequency of the target virtual page falls as the migration destination tier.

Then, in S1314, the MP 34 enters in the migration destination page table 100 a target virtual page number in the virtual page ID 1001, a migration source tier level in the migration source TIER_ID 1002, and a migration destination tier level that has been determined in the migration destination TIER_ID 1003, and sets the status of the migration status 1004 to "not migrated".

In S1315, the MP 34 selects an unallocated real page from the migration destination tier, and migrates the data stored in the migration source real page within the migration source tier to the selected real page (migration destination real page). The migration source real page is a real page allocated to the target virtual page.

Next, the MP 34 updates the real page management table 90 and the migration page table 100. Actually, the tier level of the migration destination tier is entered to the TIER_ID 903 of the real page management table 90, and the status of the migration status 1004 of the migration page table 100 is updated from "not migrated" to "migrated".

In S1316, the MP 34 determines whether the target virtual page is a virtual page at the terminal end of the target VVOL (final virtual page) or not. If the page is a virtual page at the terminal end of the target VVOL (S1316: Yes), the MP 34 ends the data migration processing of the inter-page migration processing.

If the page is not a virtual page at the terminal end of the target VVOL (S1316: No), the MP 34 selects a next virtual page from the target VVOL in S1317 and re-executes the processes of S1312 and thereafter for the target virtual page.

<<RG Allocation>>

<Problems of the Prior Art>

Figure 14:
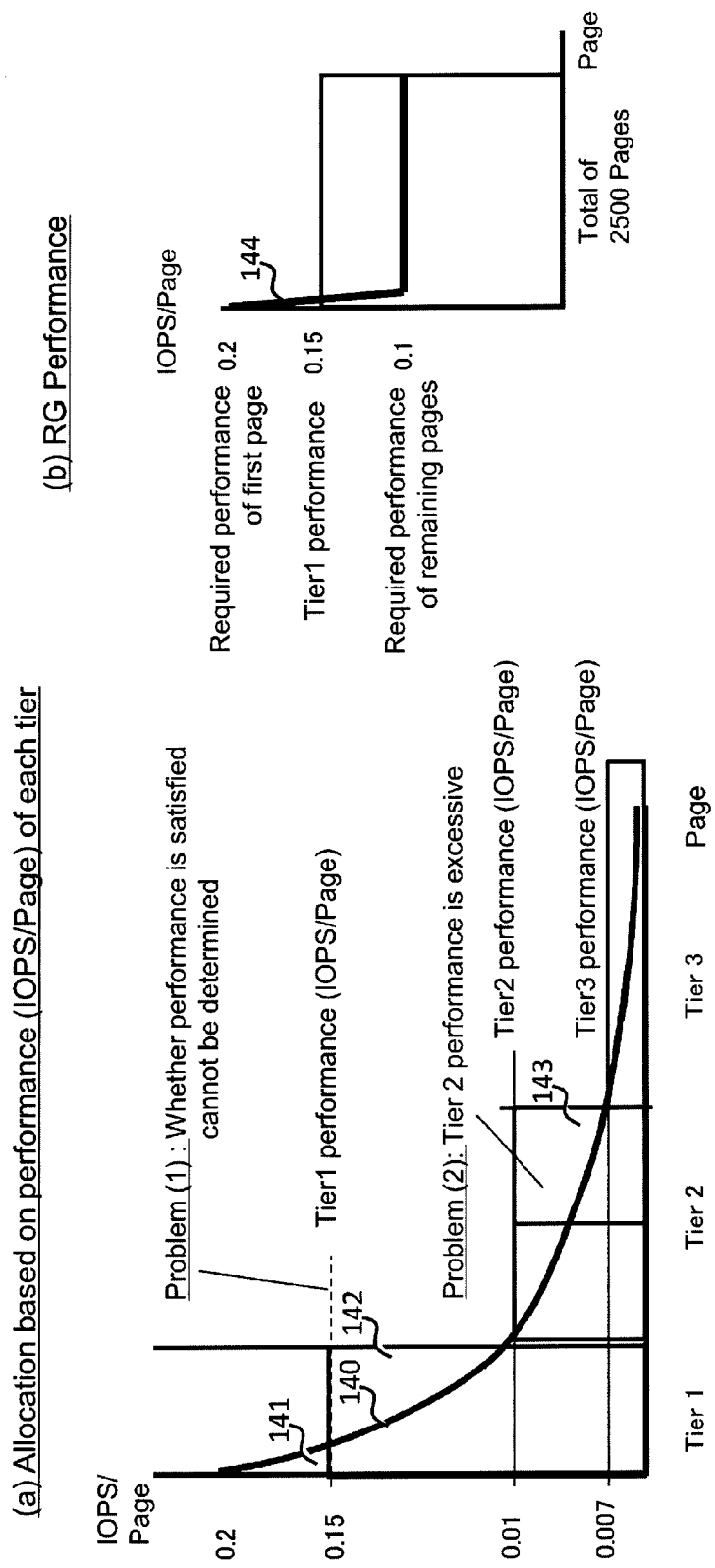
FIG. 14 is a view illustrating the problems in a prior art tier configuration computing method.

FIG. 14 is a view illustrating the problems according to a prior art method for computing the tier configuration.

In the prior art page relocation method in dynamic tiering, that is, in the method for selecting tiers based on the average access frequency per page (IOPS/Page), there were two problems (1) and (2) mentioned below.

(1) Performance Satisfaction Cannot be Determined

The performance potential per page (IOPS/Page) of each tier divides the maximum performance of the RG by the total number of pages of the RG, so that the maximum performance is averaged per page (average performance). If access is concentrated to the page having an upper level performance, it is not possible to determine whether the required performance is satisfied or not.

In other words, the page belonging to area 141 in the I/O access curve (number of I/O accesses per page) of FIG. 14 (*a*) does not satisfy the average performance of Tier1 (0.15 IOPS/Page). On the other hand, the page belonging to area 142 satisfies the average performance of Tier1. However, as for the whole RG, it is not possible to determine whether the required performance is satisfied or not.

The reason is described with reference to FIG. 14 (*b*). In FIG. 14 (*b*), the RG performance of Tier1 is 0.15 IOPS/Page, but the I/O access frequency 144 to the first page is 0.2 IOPS/Page. Therefore, in the I/O access to the first page, the RG performance of Tier1 is not satisfied, so that it appears that the performance is not satisfied throughout the whole RG (total of 2500 pages).

However, according to the required performance Req1 of the I/O access to the whole RG (total of 2500 pages), the required performance from the second page to the 2500th page is 0.1 IOPS/Page, so that Req1=0.2 IOPS/Page×1 page+0.1 IOPS/Page×2499 pages=250.1 IOPS.

On the other hand, the maximum performance Max1 of 1 RG is Max1=0.15 IOPS/Page×2500 pages=375 IOPS.

Therefore, since the maximum performance Max1 of 1 RG exceeds the required performance Req1, the required performance is satisfied by the RG as a whole.

(2) Performance Surplus

A second problem exists in which the storage drive performance of each tier becomes excessive. That is, in the page area 143 having Tier2 allocated in FIG. 14, the I/O access curve (required performance) is smaller than the average performance 0.01 IOPS/Page of Tier2. This state is called performance surplus (capacity neck). In this case, a preferable tier allocation is made possible by allocating a storage drive constituting a tier having a small performance and large capacity (actually, a RAID group (RG) composed of a plurality of storage drives).

Therefore, the present invention solves the above-mentioned problem by computing the tier configuration using cumulative IOPS so as to compute the most appropriate tier allocation.

<Tool Configuration>

Figure 15:
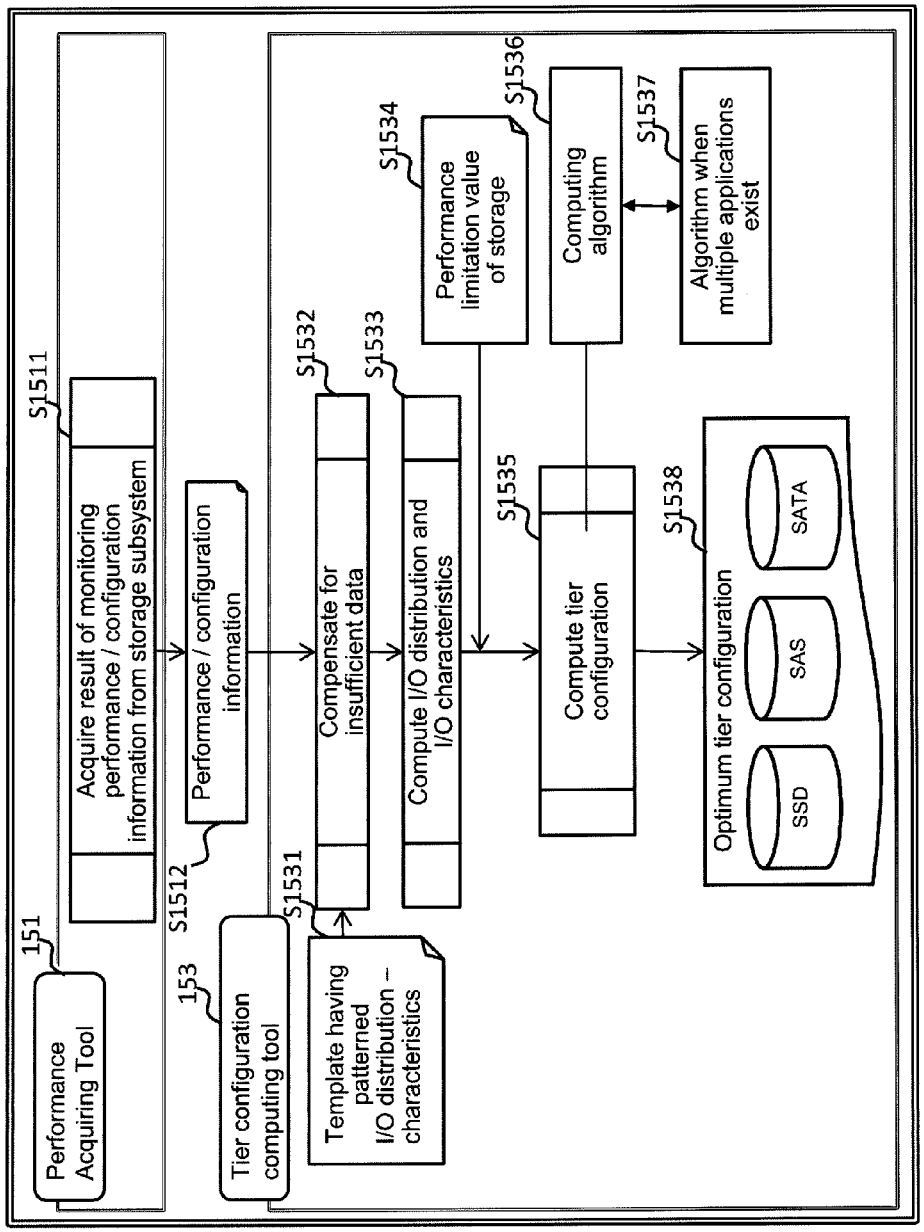
FIG. 15 is an overall configuration diagram of a tier configuration computing method according to the present invention.

FIG. 15 is an overall configuration diagram of a tier configuration computing method according to the present invention. The tools of the tier configuration computing method are mainly divided into a performance acquiring tool 151 and a tier configuration computing tool 153. The performance acquiring tool 151 and the tier configuration computing tool 153 are tools operating in the CPU 41 of the management device 15.

The performance acquiring tool 151 is a tool for acquiring the performance information and the configuration information of the storage subsystem (hereinafter referred to as performance/configuration information) monitored by virtual LU units in the storage subsystem.

Performance information is information for computing the I/O distribution and I/O characteristics, which collects the I/O count of each page in the form of the virtual page management table 80.

Configuration information refers to the information acquired from the existing storage subsystem being the monitoring target, which include serial number, port number, host group name, virtual volume number, pool ID, RG number, LU number, drive type, number of drives per drive type, and RAID level.

The amount and types of information that can be acquired differ between a pre-sales storage subsystem (corresponding to newly introduced storage subsystem 17 or existing subsystem 13 newly introducing the dynamic tiering function) and a post-sales storage subsystem (corresponding to the existing storage subsystem 13 already introducing the dynamic tiering function).

The tier configuration computing tool 153 is a tool for computing the optimum tier configuration based on the performance/configuration information transmitted from the performance acquiring tool 151.

At first, in S1511, the performance acquiring tool 151 acquires the monitored result of the performance/configuration information from the storage subsystem 13.

In S1512, the performance acquiring tool 151 sends the monitored performance/configuration information to the tier configuration computing tool 153.

Figure 22:
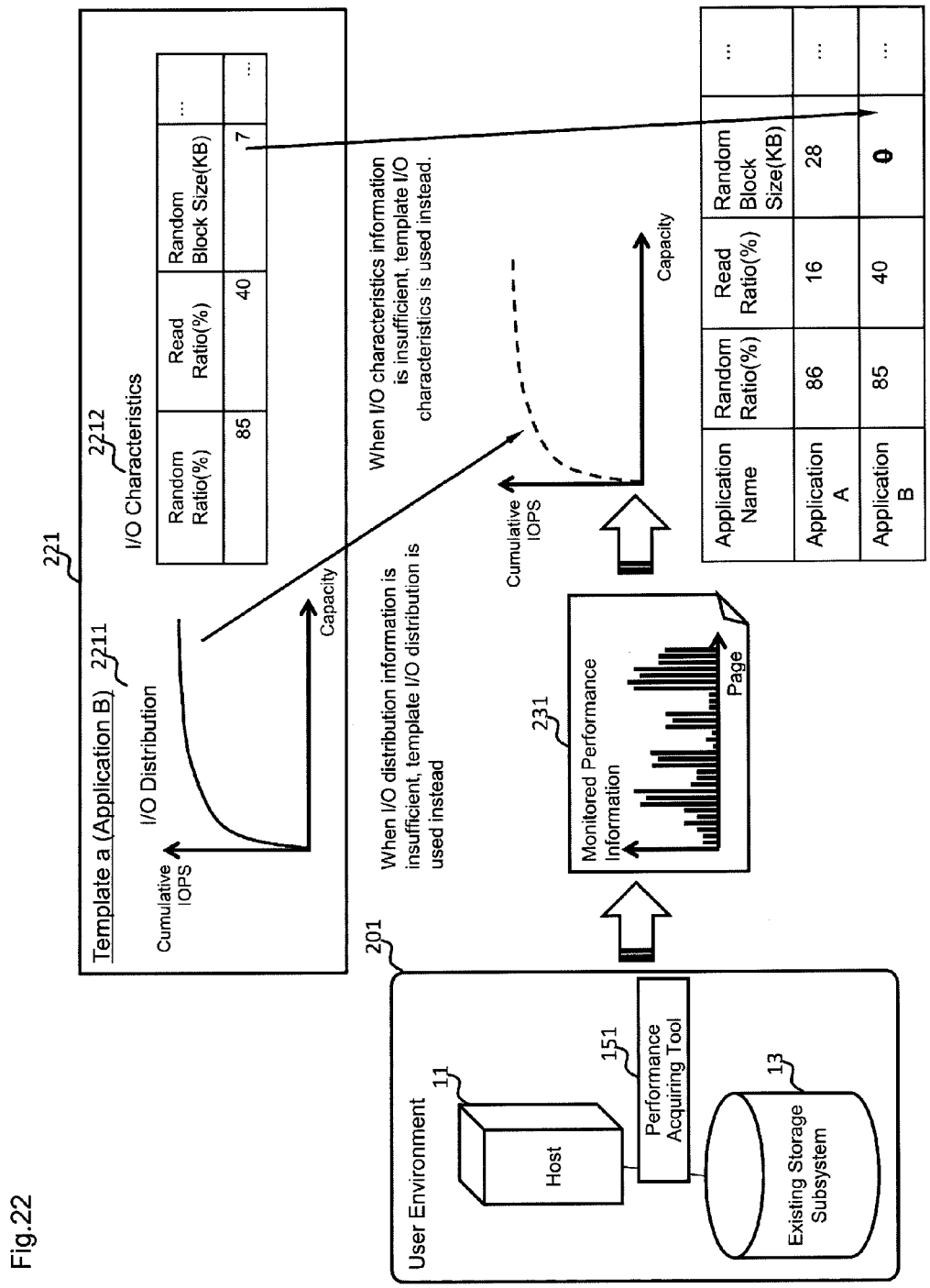
FIG. 22 is a view showing the method for supplementing the I/O distribution and I/O characteristics by applying a template.

As described, in a user environment using a pre-sales storage subsystem, there are cases where not all the information for computing the tier configuration can be acquired. Therefore, the tier configuration computing tool 153 prepares a template created in advance by acquiring the performance information and the configuration information from an environment having similar access characteristics (S1531). The template will be described in detail later (FIG. 22).

In S1532, the tier configuration computing tool 153 analyzes the performance/configuration information received from the performance acquiring tool 151, and if there is any insufficient information, the insufficient information is supplemented using the template in S1531.

In S1533, the tier configuration computing tool 153 computes the I/O distribution and I/O characteristics of each application.

Figure 30:
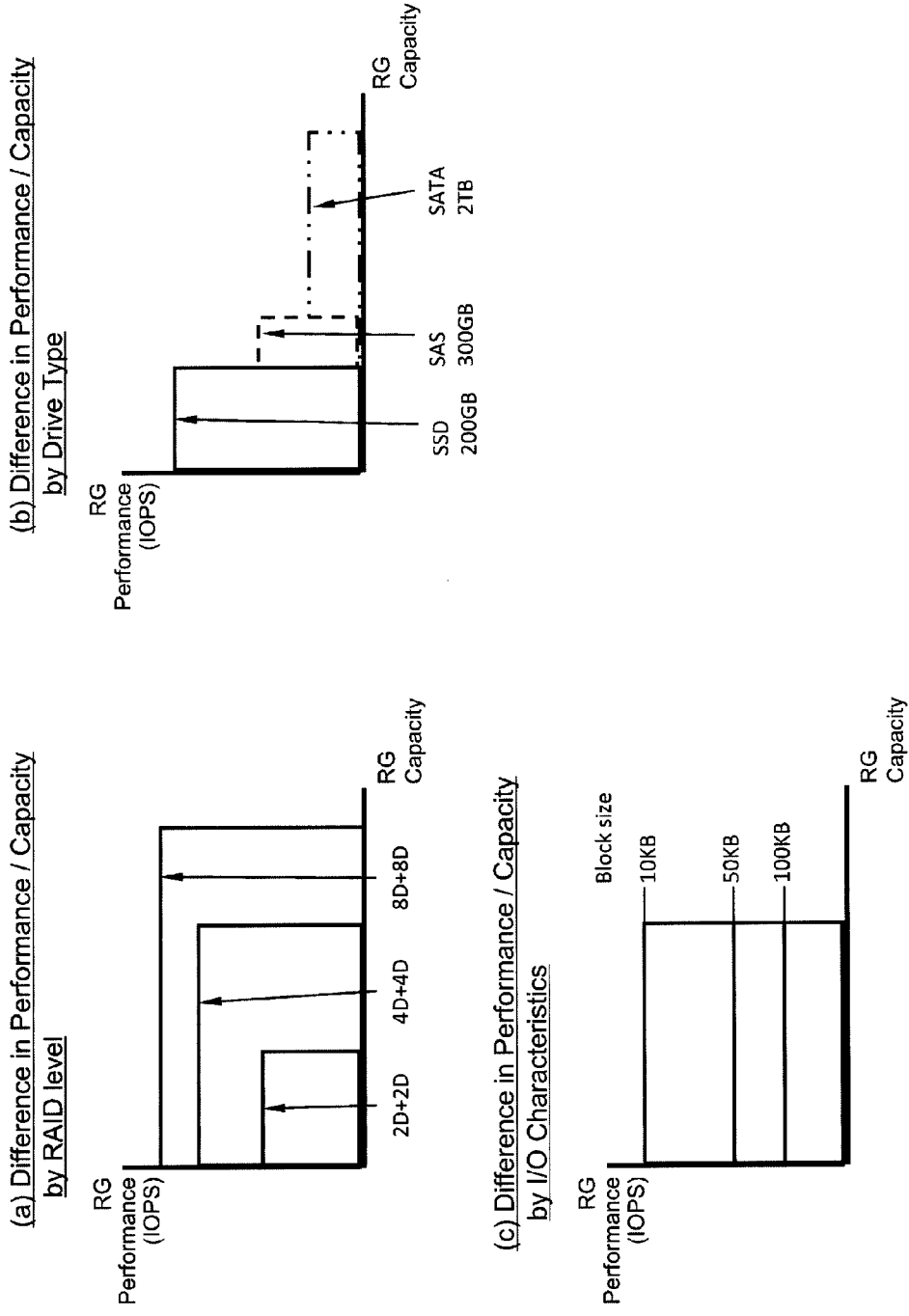
FIG. 30 is a view showing the relationship between the capacity and the access performance of the storage drives.

In S1535, the tier configuration computing tool 153 computes the tier configuration using a performance limitation value (maximum performance, maximum capacity) S1534 of the storage drive constituting the RG in the storage subsystem and a computing algorithm S1536. The performance limitation value S1534 differs for each drive type, drive configuration and the generated I/O patterns. This feature will be described in detail later (FIG. 30).

Figure 19:
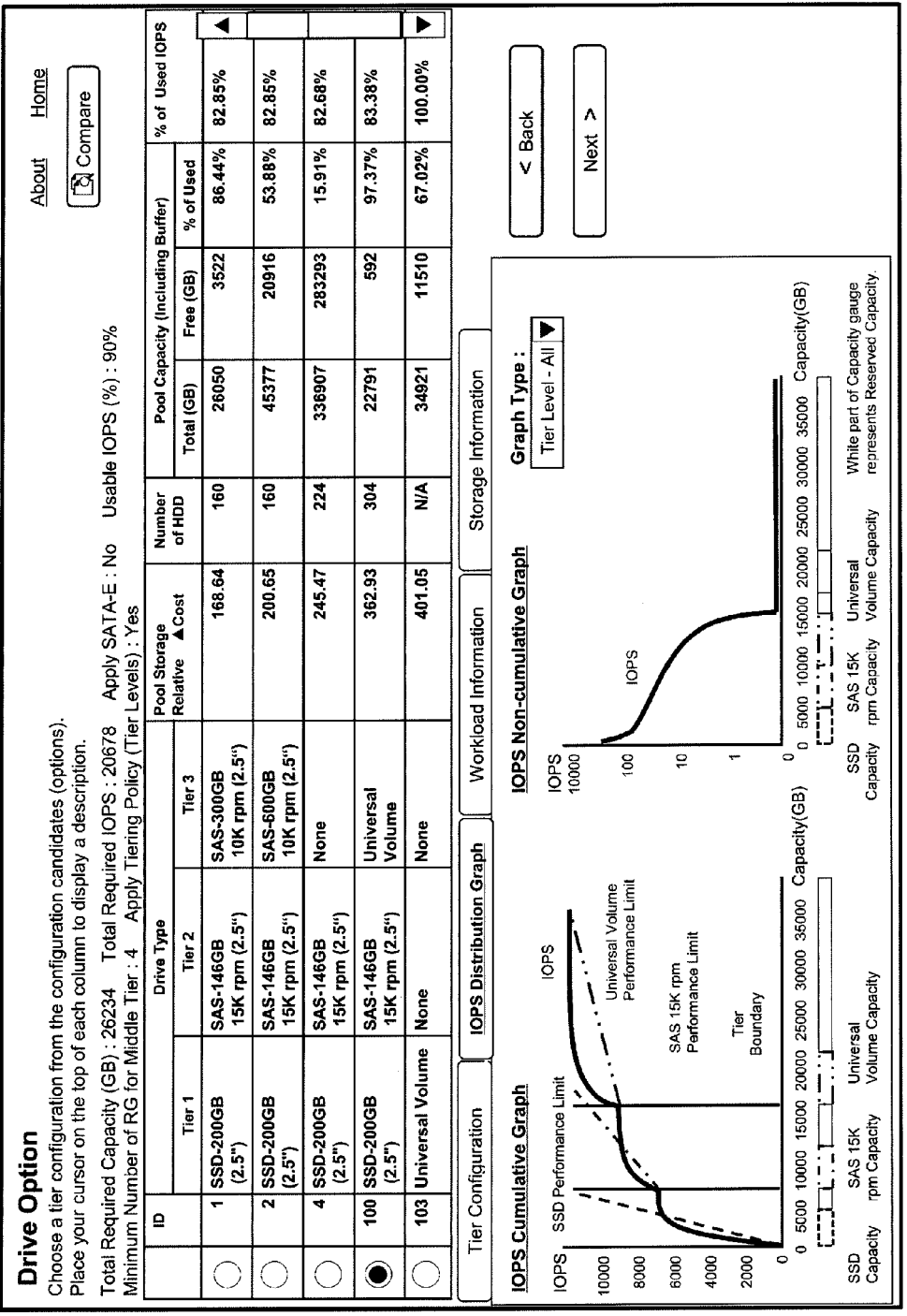
FIG. 19 is a configuration diagram of a screen for confirming result of computing tier configuration.

If multiple applications exist in a single virtual LU, the optimum tier configuration is computed further using an algorithm corresponding to the case where multiple applications exist in mixture as described later (FIG. 42). Lastly, in S1538, the tier configuration computing tool 153 displays the computed optimum tier configuration on the display screen of the management device, as shown in FIG. 19.

<Input and Output GUI>

FIGS. 16 through 19 are views showing the image of input/output GUI in the management device.

FIG. 16 is a configuration diagram of a screen showing the performance/configuration information. Screen 161 of FIG. 16 is a screen for showing and confirming workload information (application name, size of single application or data used by the application, access frequency, tier level etc.) acquired via the performance acquiring tool 151 and for entering the workload information.

Figure 17:
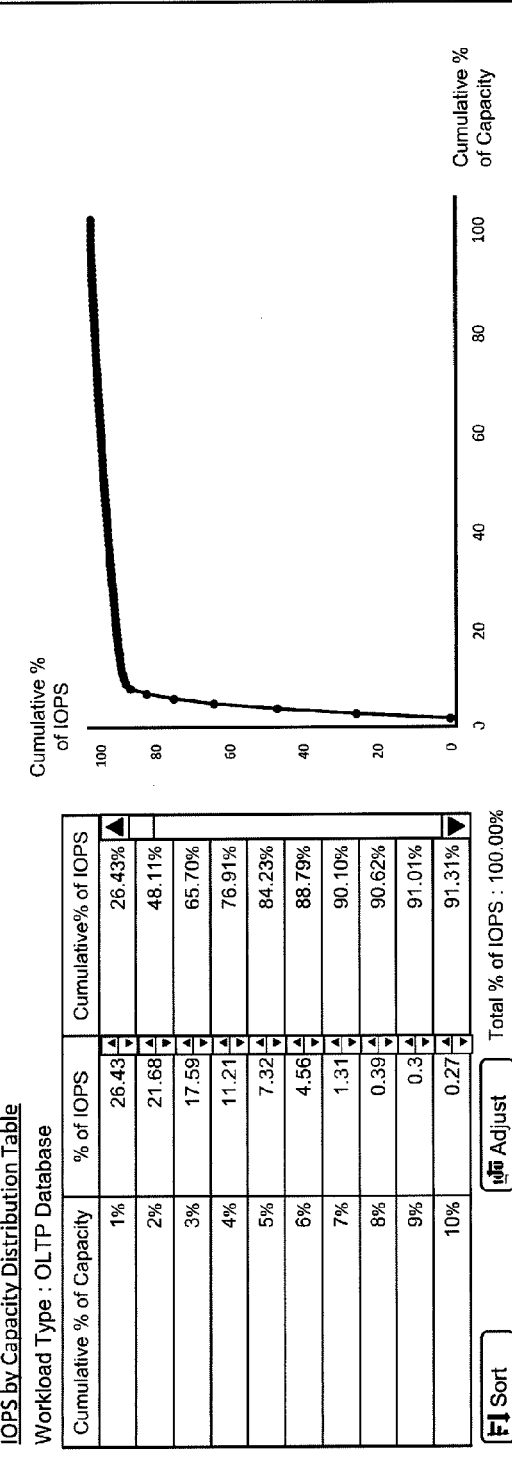
FIG. 17 is a configuration diagram of a screen for confirming the I/O distribution and characteristics.

FIG. 17 is a configuration diagram of the screen for confirming the I/O distribution and characteristics. Screen 171 of FIG. 17 is a screen for outputting or entering the performance information acquired via the performance acquiring tool 151 or the template information mentioned later.

FIG. 18 is a configuration diagram of the screen for confirming the HDD configuration. Screen 181 of FIG. 18 is a screen for outputting or setting the drive configuration information (such as the type of the storage drive or the RAID level of each storage drive).

FIG. 19 is a configuration diagram of the screen for confirming the result of computing the tier configuration. Screen 191 of FIG. 19 is a screen for confirming the computed result via the tier configuration computing tool (such as the result of tier configuration and the cumulative curve of I/O distribution).

<Method for Computing I/O Distribution and I/O Characteristics>

Figure 20:
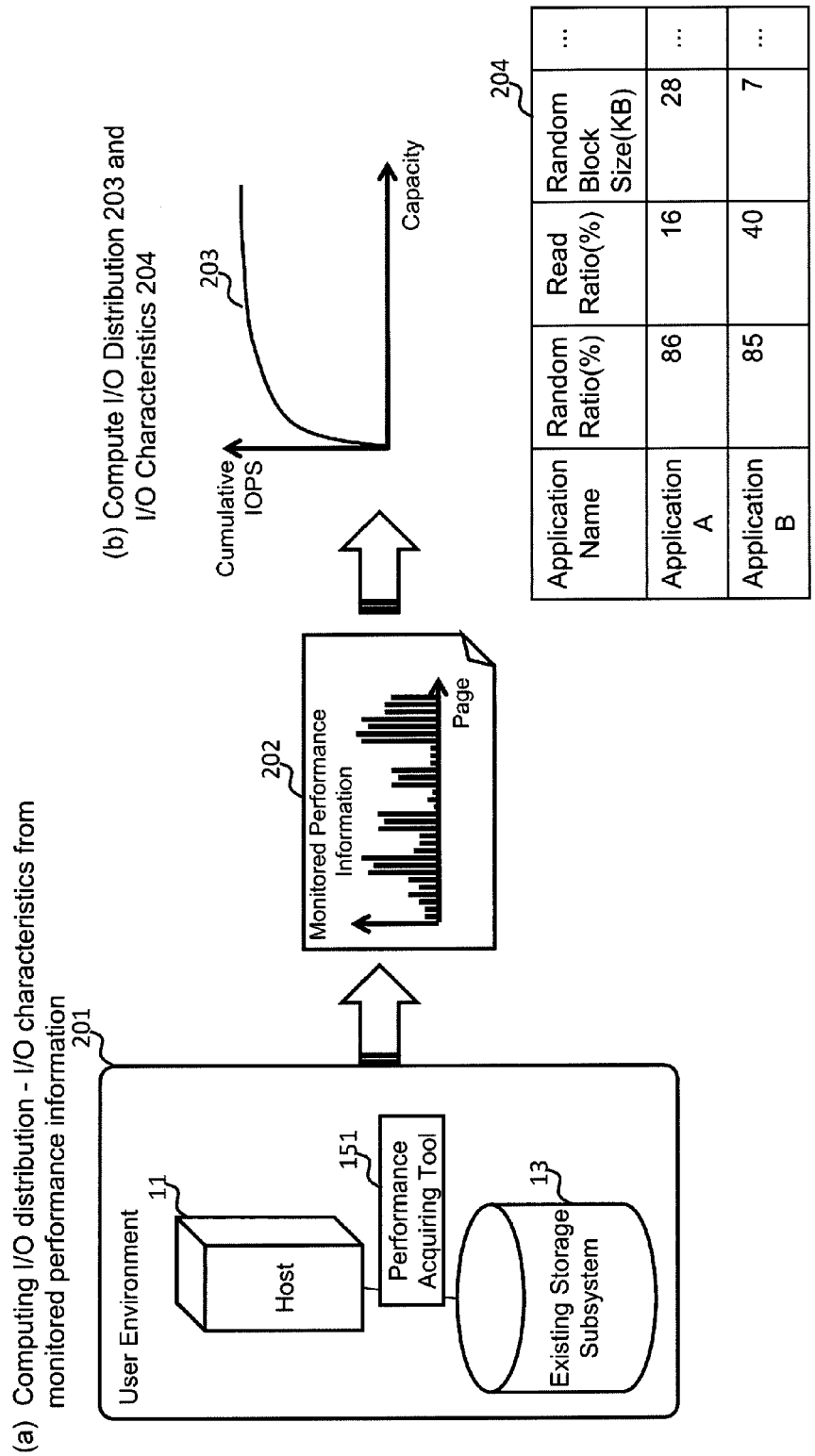
FIG. 20 is a view showing a method for computing I/O distribution and I/O characteristics.

FIG. 20 is a view showing the method for computing the I/O distribution and I/O characteristics.

The performance acquiring tool 151 acquires the result of the monitored performance/configuration information in the host 11 and the existing storage subsystem 13 in the user environment 201 from the existing storage subsystem 13. Based on the acquired monitored performance information 202, the performance acquiring tool 151 creates the I/O distribution 203 and the I/O characteristics 204.

Further, if multiple applications exists in a single virtual LU, the performance acquiring tool 151 creates the I/O distribution 203 and the I/O characteristics 204 for each application. For example, the performance acquiring tool 151 computes the I/O characteristics (I/O count per I/O type 81) for each application A and application B as in the I/O characteristics 204 shown in the drawing. The processes other than acquiring performance/configuration information can be performed by the tier configuration computing tool 153.

Figure 21:
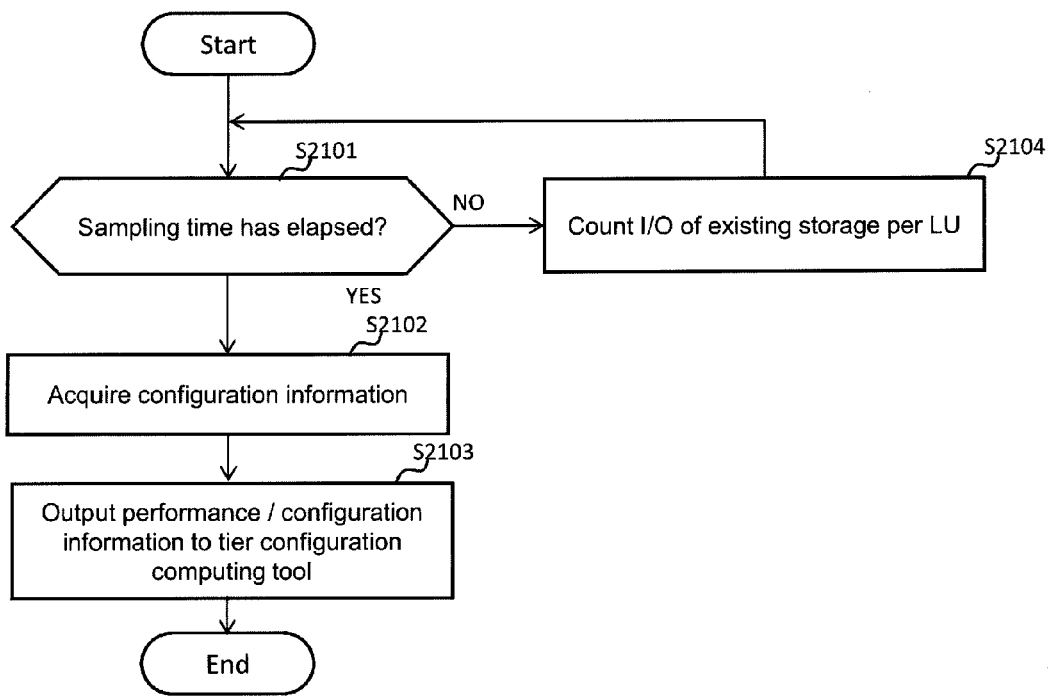
FIG. 21 is a flowchart showing the acquisition of a monitored result of performance/configuration information.

FIG. 21 is a flowchart showing the acquisition of monitoring result of the performance/configuration information. The process for acquiring the monitoring result of the performance/configuration information is executed by the performance acquiring tool 151 operating in the CPU 41 of the management device 15.

In S2101, the performance acquiring tool 151 determines whether a sampling time has elapsed or not. If a given sampling time has not elapsed (S2101: No), the performance acquiring tool 151 acquiores and counts the I/O from the host 11 to the existing storage subsystem 13 for each virtual LU (S2104). Thereafter, the performance acquiring tool 151 executes S2101 again.

If a given sampling time had elapsed (S2101: Yes), the performance acquiring tool 151 acquires the configuration information per virtual LU of the existing storage subsystem 13 (S2102).

Finally, in S2103, the performance acquiring tool 151 outputs the acquired performance/configuration information S1512 (FIG. 15) to the tier configuration computing tool 153. Based on the configuration of FIG. 20 and the processing of FIG. 21, the management device 15 can acquire the performance/configuration information of the existing storage subsystem 13.

<Application of Template>

FIG. 22 is a view showing the method for complementing the I/O distribution and I/O characteristics by applying a template.

As described, in a user environment adopting a pre-sales storage subsystem (such as when introducing a new device or when newly introducing a dynamic tiering function) or when using a new application in a post-sales storage subsystem (such as when using an existing storage subsystem 13), there are cases where not all the performance/configuration information for computing the tier configuration can be acquired. Therefore, performance information per application is acquired in the usage environment having a similar access characteristics (I/O distribution and I/O characteristics), and insufficient information is supplemented using the created template.

For example, if it is not possible to compute the I/O distribution of application B based on the performance information monitored in the user environment 201 in FIG. 22, an I/O distribution template 2211 in template (application B) 221 is used.

Similarly, if it is not possible to computer the I/O characteristics of application B, the I/O distribution template 2212 of template (application B) 221 is used. In the drawing, the information on the Random Block Size (KB) of application B is insufficient, so the Random Block Size (KB) information of template (application B) 221 is used as the I/O characteristics.

Figure 23:
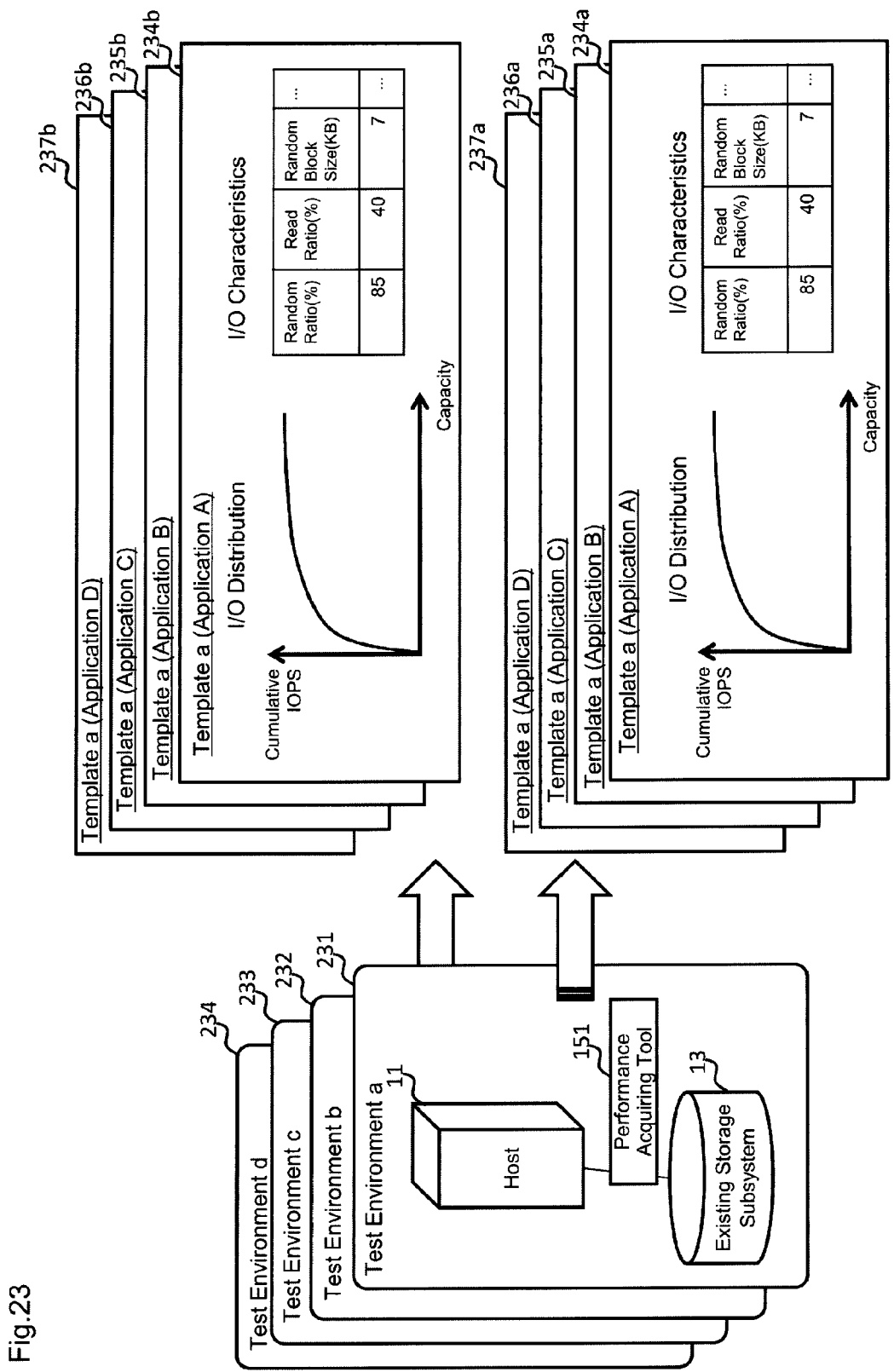
FIG. 23 is a view showing the method for creating a template.

FIG. 23 is a view showing a method for creating templates.

Templates are created by the performance acquiring tool 151 performing performance evaluation of the major applications used in the storage subsystem individually, based on the performance information. For example, application A is operated in test environment a 231, and the I/O from the host 11 to the existing storage subsystem 13, that is, performance information, is acquired via the performance acquiring tool 151. Based on the acquired performance information, template a (application A) 234a is created. Similarly, application B is subjected to performance evaluation in test environment a 231, and template a (application B) 235a is created. Such performance evaluation and template creation are performed for all major applications used in the storage subsystem, and a template group in test environment a (234a to 237a) is created.

Further, the conditions of the test environment are changed, and for example, major applications are subjected to evaluation in test environment b 232 which has a higher load than the test environment a 231, so as to create a template group (234b to 237b) in test environment b 232. Test environment c 233 and test environment d 234 are used similarly.

The above-described operation is performed while changing the conditions of the test environment so as to create a template group corresponding to each application in the respective test environment. Thus, templates having a versatile I/O distribution and I/O characteristics information that can be applied to any scale range (range covering low to high loads) are obtained.

A preferable template corresponding to application and environment of use is selected from these versatile templates and insufficient information is supplemented therefrom, so as to acquire an I/O distribution and I/O characteristics information preferable for computing the tier configuration.

<Method for Computing I/O Distribution and I/O Characteristics>

Figure 24:
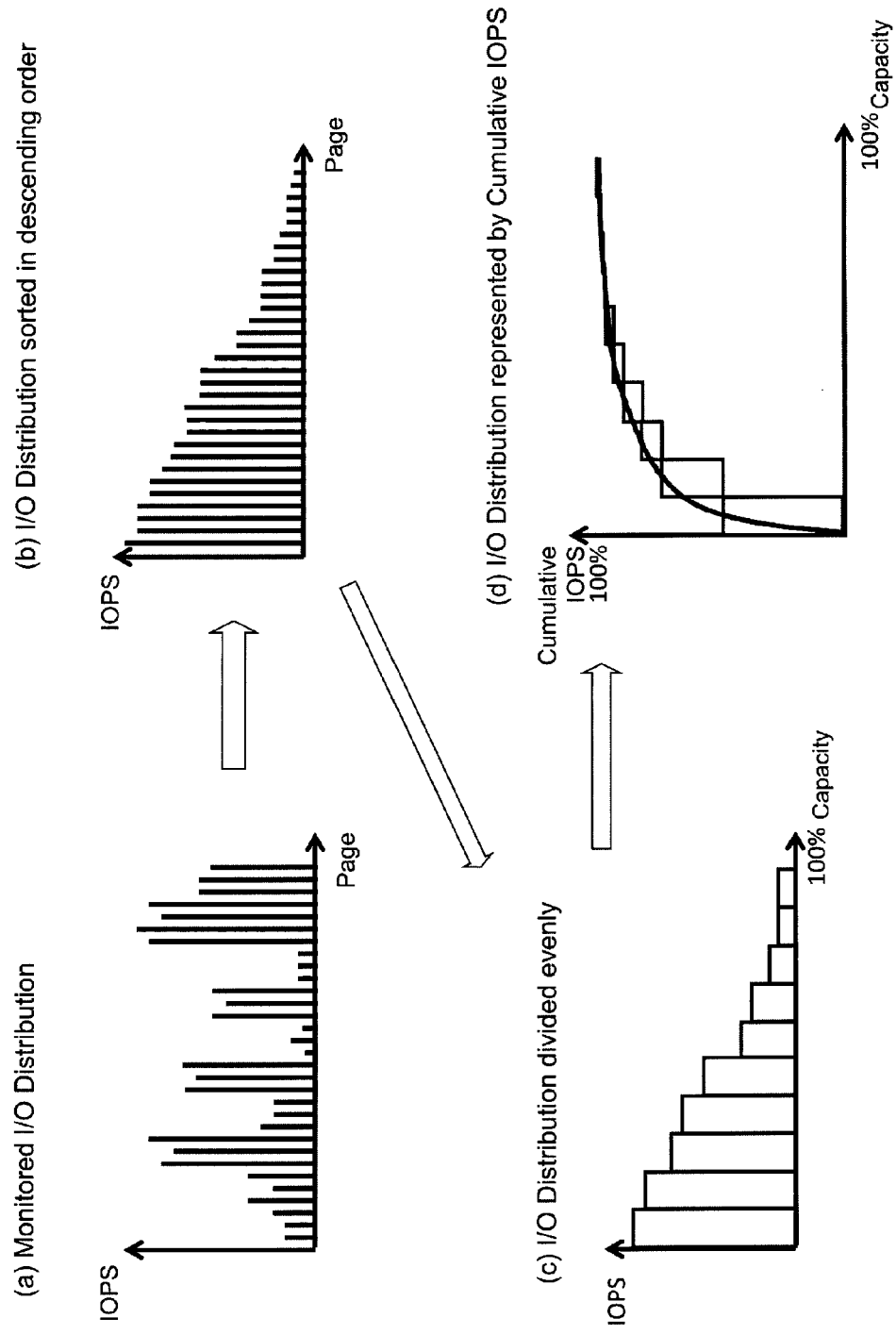
FIG. 24 is a conceptual diagram showing how the I/O distribution is computed.

FIG. 24 is a conceptual diagram illustrating the computed I/O distribution.

As shown in FIG. 1, the present invention executes the following steps (a) to (d) to first acquire the cumulative curve of I/O distribution.

(a) Monitored I/O Distribution

The performance acquiring tool 151 acquires the performance information which is the result of computing the number of I/O accesses per storage area (virtual page or real page) divided into given units used by the application operated by the host 11 in the existing storage subsystem 13. The performance acquiring tool 151 creates an "I/O distribution graph of page number–IOPS" setting the acquired page number on the horizontal axis and the acquired number of I/O accesses (IOPS) on the vertical axis based on the acquired performance information.

(b) I/O Distribution Sorted in Descending Order

The performance acquiring tool 151 sorts the pages in order from pages having greater IOPS to pages having smaller IOPS in the created I/O distribution graph.

(c) I/O Distribution Divided Uniformly

The performance acquiring tool 151 assembles the horizontal axis of the sorted I/O distribution graph in given page number units. For example, the pages are assembled by 10 pages, and the horizontal axis is equally divided into 10 by 10% intervals. The vertical axis shows the sum of the number of I/O accesses of the assembled pages. Using the horizontal and vertical axes obtained as described, the performance acquiring tool 151 acquires the "I/O distribution graph of capacity (%)–IOPS".

(d) I/O Distribution Graph Shown Via Cumulative IOPS

The performance acquiring tool 151 creates a cumulative curve of I/O distribution having the vertical axis of the "I/O distribution graph of capacity (%)–IOPS" showing the ratio with respect to the cumulative IOPS ("I/O distribution graph of capacity (%)–IOPS (%)").

The performance acquiring tool 151 performs the above-described processes (a) to (d) for the respective applications, and creates the "I/O distribution graph of capacity (%)–IOPS (%)" for each application. Incidentally, it is possible for the performance acquiring tool 151 to execute acquisition of performance information from the existing storage subsystem 13 of (a) and the tier configuration computing tool 153 to execute the other processes.

Figure 25:
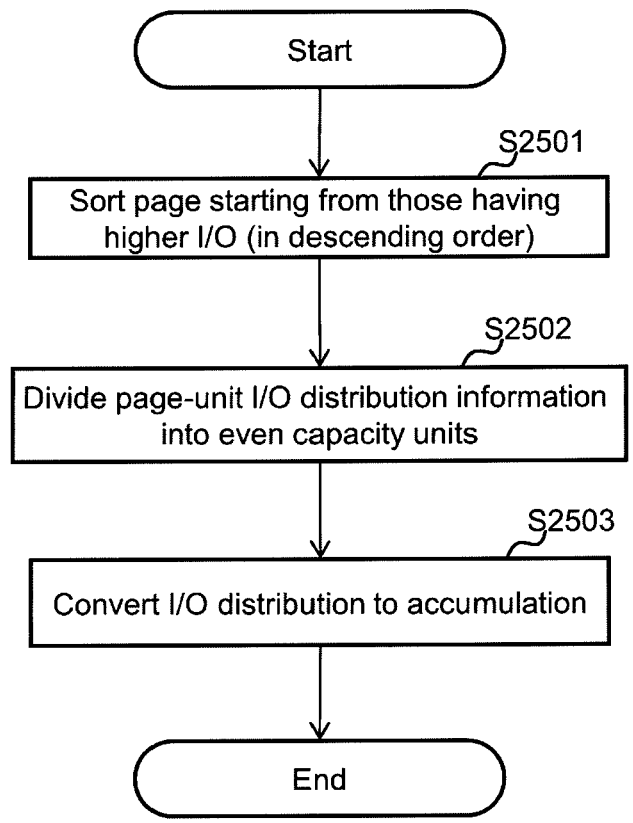
FIG. 25 is a flowchart for computing the I/O distribution shown by percentage.

FIG. 25 is a flowchart computing the I/O distribution expressed by percentage.

In S2501, the performance acquiring tool 151 rearranges the pages so that the pages are arranged in order from the pages having higher numbers of I/O accesses (IOPS) to the pages having lower numbers, in other words, in descending order.

In S2502, the performance acquiring tool 151 divides the I/O distribution information in page units to even capacity units.

In S2503, the performance acquiring tool 151 converts the I/O distribution achieved by dividing the information into even capacity units to a cumulative curve, and creates a cumulative curve of I/O distribution representing the capacity (horizontal axis) and the IOPS (vertical axis) by percentage with the total value set to 100%. This process can also be executed by the tier configuration computing tool 153.

Figure 26:
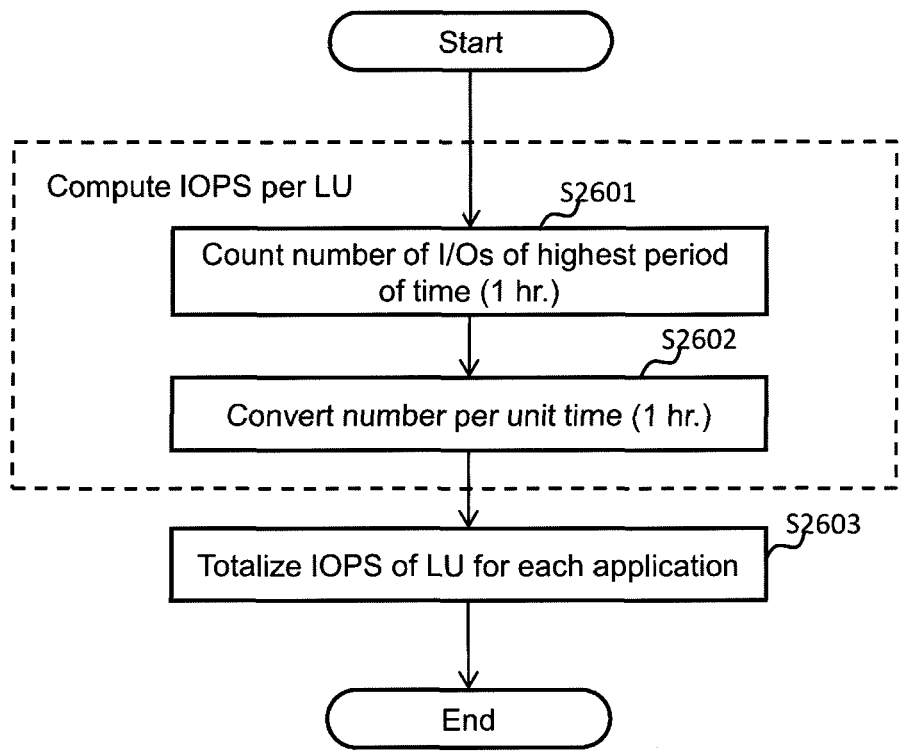
FIG. 26 is a flowchart for converting the I/O distribution from percentage format to IOPS–capacity format.

FIG. 26 is a flowchart converting the above-mentioned cumulative curve of I/O distribution from percentage form to IOPS-capacity form. IOPS is taken as an example in the flowchart of FIG. 26, but in the case of capacity, the total capacity being used by each virtual LU is converted into actual capacity.

At first in S2601, in order to compute the IOPS per virtual LU, the performance acquiring tool 151 counts the I/O count of the period of time (1 hr) in which the load is highest for each application. This step is performed so as to enable the most appropriate storage drive to be allocated based on the period of time in which the load is highest, so that the processing performance is not deteriorated.

In S2602, the performance acquiring tool 151 converts the measured I/O count to a value per unit time (1 hr).

In S2603, the performance acquiring tool 151 acquires the sum of the IOPS of the LU for each application. Then, the total IOPS count is multiplied by the I/O percentage (%) to acquire the "actual IOPS distribution U (vertical axis)".

As for the conversion of the value to the actual capacity distribution value, the number of I/Os and IOPS by the process of steps S2601 to S2603 is computed by the total amount of use of the storage capacity per LU. In other words, the actual capacity distribution value is acquired by multiplying the capacity percentage (%) by the storage capacity used by the application. The above-described process enables to compute the tier configuration by the performance of the most appropriate storage drive even when the I/O load is highest. This process can also be executed by the tier configuration computing tool 153.

Figure 27:
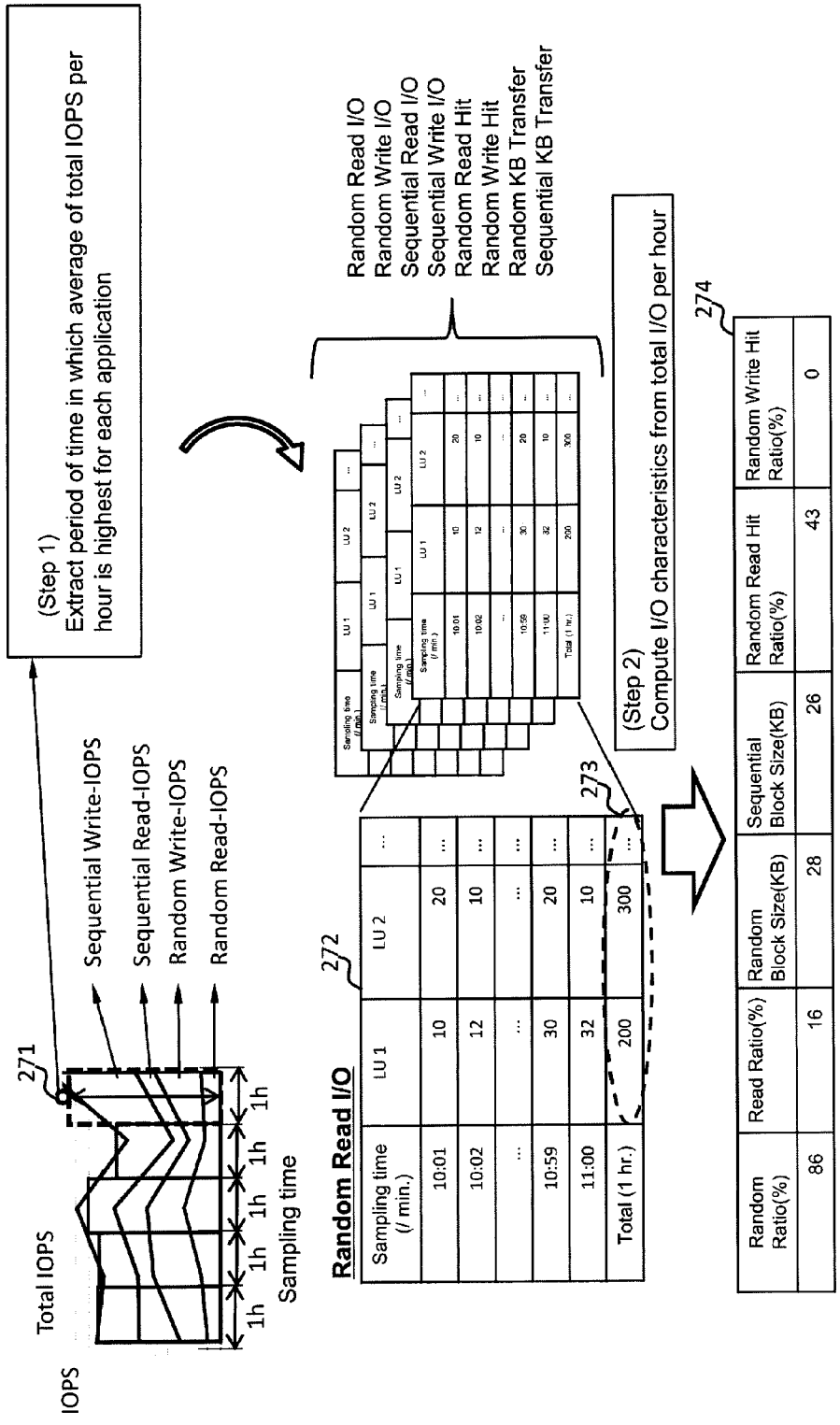
FIG. 27 is a conceptual diagram for computing the I/O characteristics.

FIG. 27 is a conceptual diagram for computing the I/O characteristics.

First, the I/O count is counted for each I/O type (such as read/write I/O or random/sequential I/O), and the average value within the sampling time is set as the I/O characteristics. At this time, the total number of I/O accesses within the sampling time where load is highest is extracted. This step is performed to compute the tier configuration so that the performance of the storage drive is most appropriate in the state where the I/O load is highest.

Therefore, at first, the performance acquiring tool 151 extracts the period of time in which the average of the total IOPS per hour is highest (step 1). Thereafter, the performance acquiring tool 151 computes the total number of I/O accesses per virtual LU in which the application operates, and computes the I/O characteristics based on the total value. The above computing operation is performed for each application, so as to compute the I/O characteristics per application (step 2). This process can also be executed by the tier configuration computing tool 153.

Figure 28:
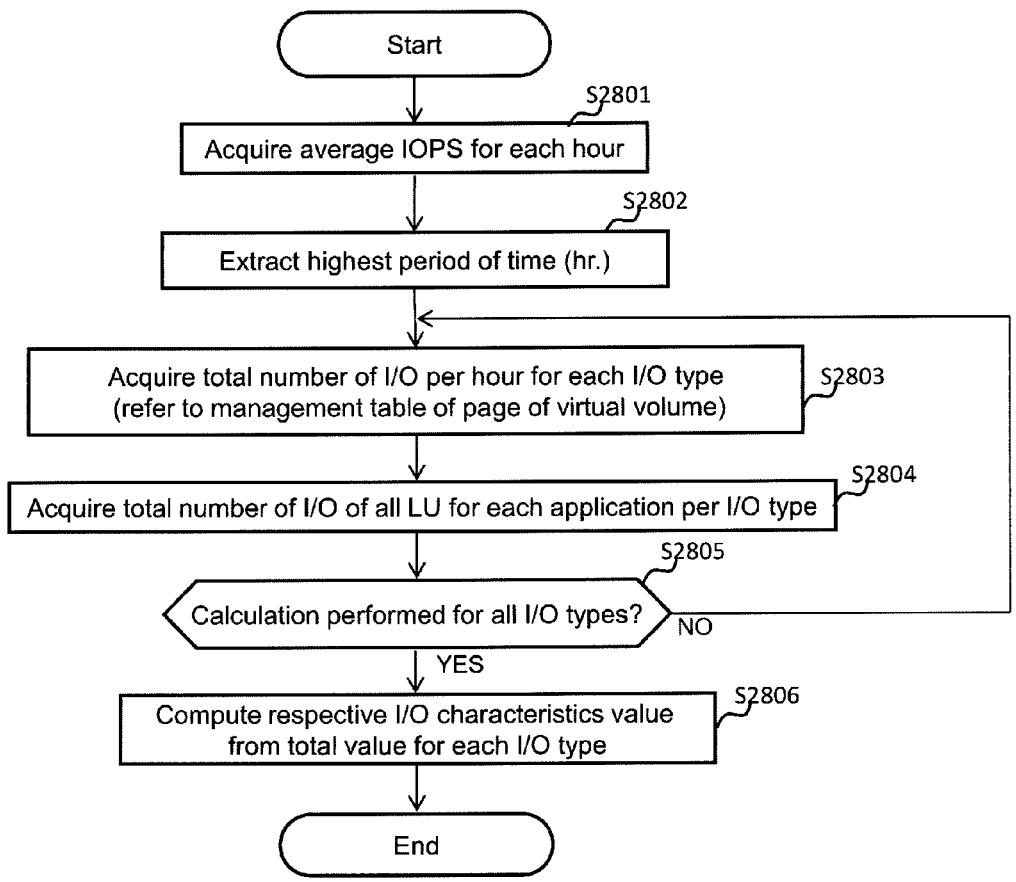
FIG. 28 is a flowchart for computing the I/O characteristics.

FIG. 28 is a flowchart for computing the I/O characteristics.

In S2801, the performance acquiring tool 151 totals the I/O count for each I/O type per period of time (1 hr), and calculates the average IOPS per hour.

In S2802, the performance acquiring tool 151 extracts the period of time (1 hr) in which the average IOPS per hour is highest (reference number 271 of FIG. 27). For example, the total IOPS of each I/O type within each period of time is acquired, and the period of time in which the acquired IOPS is highest is selected.

In S2803, the performance acquiring tool 151 refers to the virtual page management table 80, and computes the IOPH (I/O count per hour) for each I/O type of the highest period of time (1 hr) for each LU (for each LU1 and LU2 of FIG. 27) (reference number 272 of FIG. 27).

In S2804, the performance acquiring tool 151 computes the total IOPH of each I/O type of the whole LU that the application uses (reference number 273 of FIG. 27).

In S2805, the performance acquiring tool 151 determines whether the calculation has been performed for all I/O types.

If the calculation is not completed (S2805: No), the performance acquiring tool 151 re-executes the processes from S2801 to S2804.

If the calculation is completed (S2805: Yes), the performance acquiring tool 151 computes the I/O characteristics value of each application (reference number 274) from the IOPH of each I/O type calculated in S2804 (S2806). This process can also be executed by the tier configuration computing tool 153.

<Determination of Template Application>

Figure 29:
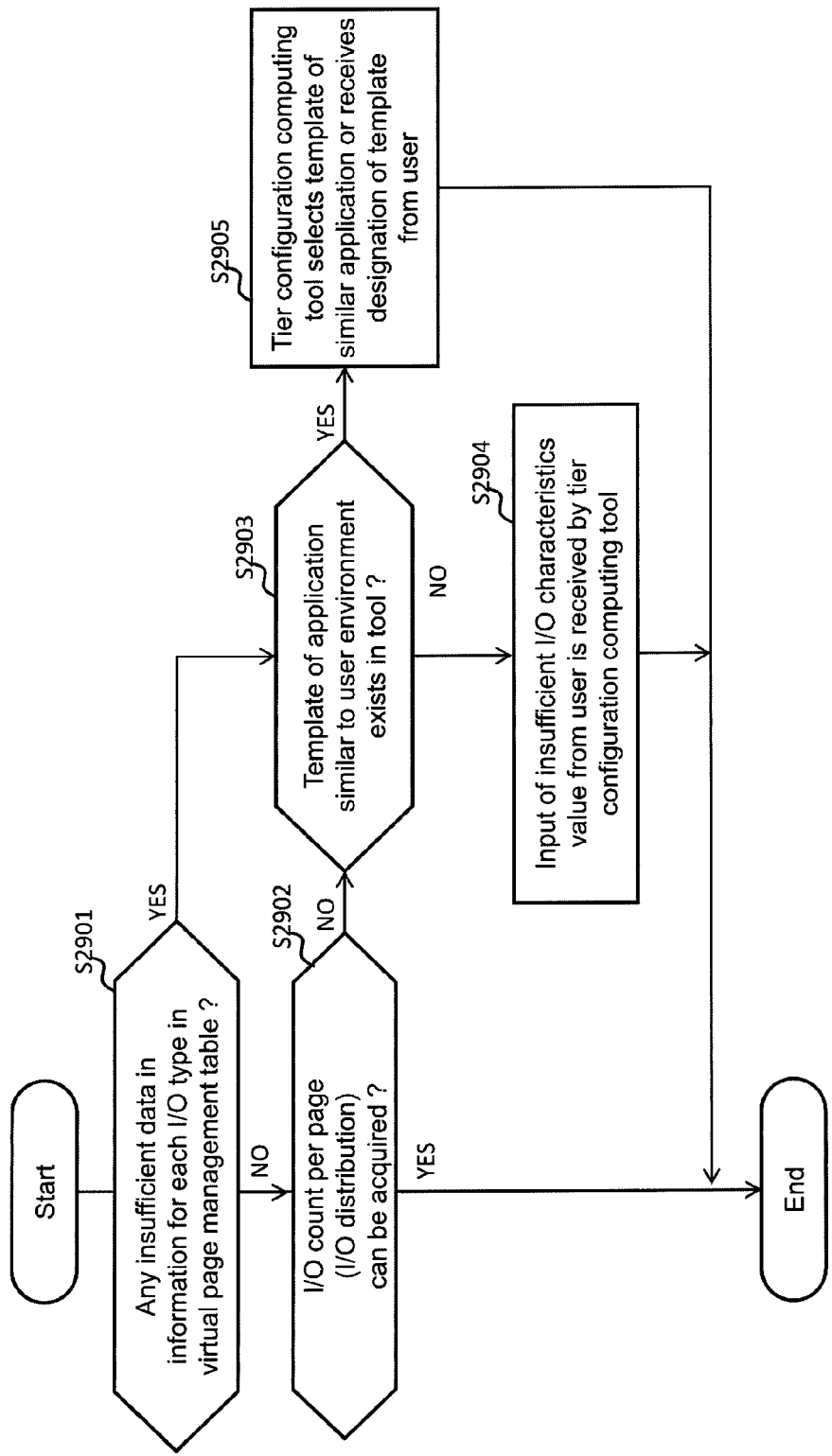
FIG. 29 is a flowchart for determining whether to apply a template or not.

FIG. 29 is a flowchart for determining whether a template should be applied or not.

In S2901, the tier configuration computing tool 153 determines whether there is any lack of data based on the information for each I/O type in the virtual page management table 80.

If there is no lack of data (S2901: No), in S2902, the tier configuration computing tool 153 determines whether the I/O count per page (I/O distribution) can be acquired or not.

If the I/O distribution can be acquired (S2902: Yes), the tier configuration computing tool 153 ends the template application process, and if the I/O distribution cannot be acquired (S2902: No), the tier configuration computing tool 153 executes S2903.

In S2903, the tier configuration computing tool 153 determines whether a template of an application similar to the user environment exists or not.

If there is no template of a similar application (S2903: No), the tier configuration computing tool 153 executes S2904, and if there is such template (S2903), the procedure executes S2905.

In S2904, the tier configuration computing tool 153 receives the "insufficient I/O characteristics value" entered by the user, and ends the template application process.

In S2905, the tier configuration computing tool 153 either selects a template of a similar application or receives designation of a template from the user.

Based on the above processes, it becomes possible to determine whether there is any insufficient information in the I/O distribution or the I/O characteristics in the performance/configuration information received from the performance acquiring tool 151, and to complement the insufficient information.

<<Computation of Tier Configuration>>

<Storage Drive Capacity and Access Performance>

FIG. 30 is a view showing the relationship between the storage drive capacity (RG capacity) and access performance (RG performance).

If the BE-IF 36 of the storage subsystem is 6 Gbps SAS, the total bandwidth in a wide link of DKC 31 (four links) is 24 Gbps (Giga bit per second). Since there are four links, if the number of storage drives connected thereto is four or less, the access performance will be improved according to the number of mounted drives.

Even if the number of storage drives is greater than four, by parallelizing the I/O of other storage drives in the response standby time from the storage drive (such as the time-lag from requesting reading of data to the storage drive to the acquisition of data), it becomes possible to improve the access performance to the band boundary.

As shown in the performance-capacity difference by RAID level of FIG. 30 (a), as the number of storage drives increases from 4 (2D+2D) to 8 (4D+4D) and to 16 (8D+8D), the access performance (RG performance: IOPS) is also increased. However, the increase in the number of storage drives (increase of capacity) is not proportional to the increase of RG performance, and there is a limitation in the RG performance.

Further, the characteristics of the RG performance and RG capacity per storage drive is as shown in FIG. 30 (b).

The storage drive of SSD 200 GB is suitable to improve the access performance (RG performance) but the effect of increase of capacity (RG capacity) is small.

The storage drive of SAS 200 GB (15 Krpm (Kilo root per minute)) has a smaller access performance and RG performance compared to the SSD 200 GB, but can have a capacity that is 1.5 times greater than the SSD.

In SATA 2 TB (7.2 Krpm), a considerable amount of capacity must be increased to improve the access performance (RG performance).

Further, the relationship between the RG performance and RG capacity based on transferred block size is shown in FIG. 30 (c). By reducing the block size being transferred, the maximum RG performance can be increased. Further, although not shown, the maximum RG performance is varied according to the I/O characteristics, that is, the I/O type (sequential/random, read/write) or the ratio of each I/O type.

The relationship between the performance and the capacity of the storage drive varies according to the drive type and the RAID level as shown in FIG. 30. Therefore, in the case of a post-sales storage subsystem, the configuration information is acquired from an existing user environment. Further, in the case of a pre-sales storage subsystem, there are information that are impossible to acquire, so in that case, the configuration information is set up by the user or the system administrator.

<RG Management Table>

FIG. 31 is a configuration diagram of an RG management table for managing the relationship between RG performance and RG capacity.

An RG management table 310 manages, for each RG (storage media 3101), I/O characteristics such as RAID level 3102, random I/O ratio 3103 and random block size (KB) 3105, or an RG performance (IOPS) 3109 and an RG capacity (GB) 3110.

For example, an RG in which the storage media 3101 is "SSD (200 GB)" and the RAID level 3102 is "6D+2P" has an RG capacity 3110 of "1200 GB" obtained by 200 GB/device×6 devices, and the RG performance 3109 thereof is "285,496 IOPS", as shown in FIG. 30.

<Method for Computing Tier Configuration>

Figure 32:
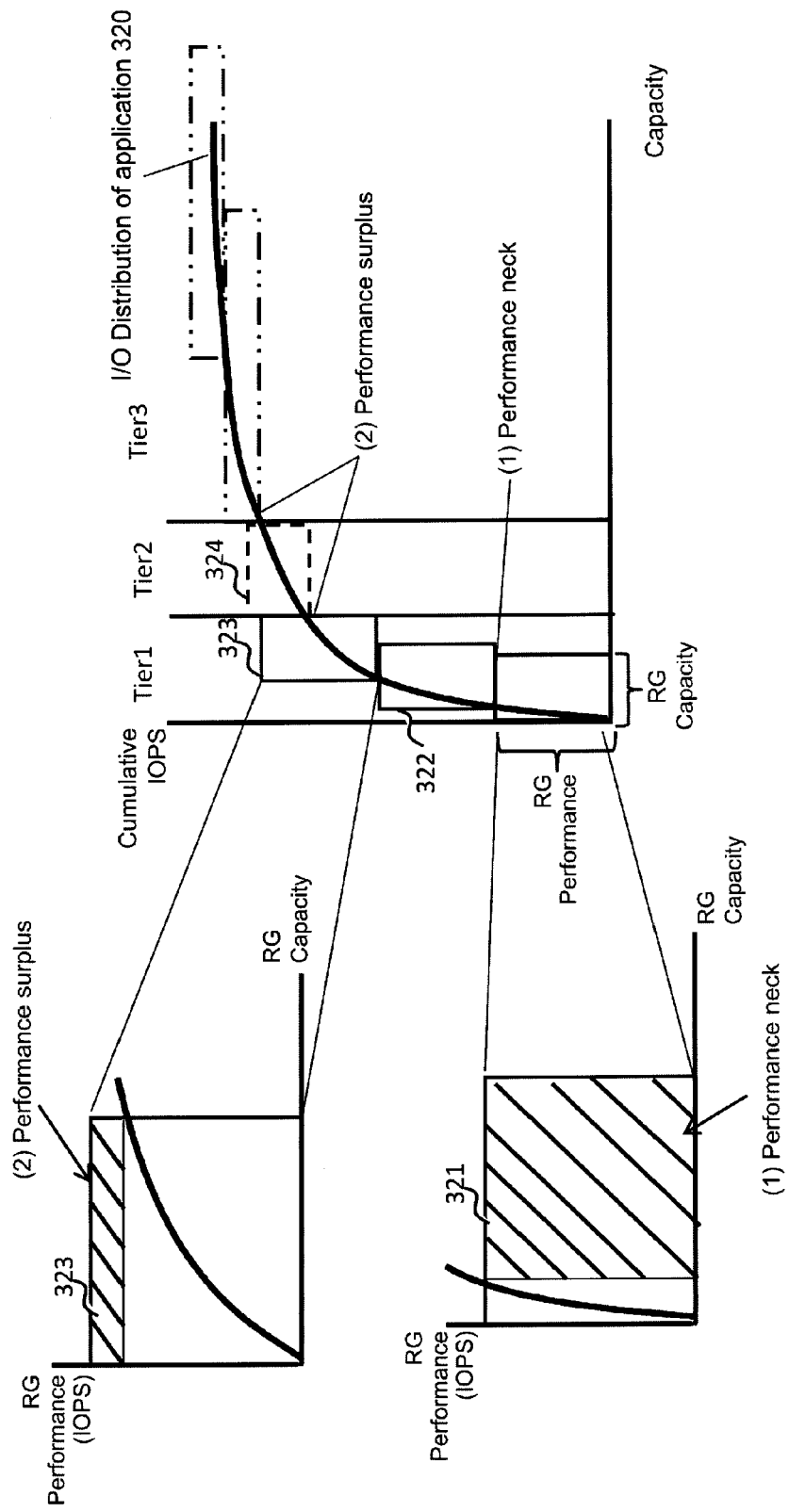
FIG. 32 is a view showing the concept of the method for computing tier configuration.

FIG. 32 is a view showing the concept of the method for computing the tier configuration.

In the method for computing tier configuration, the type of the RG allocated to each tier can be determined so that the performance of each RAID group (RG) exceeds the cumulative curve of I/O distribution of the application.

It is assumed that the performance potential that a single 1 RG can exert is fixed regardless of the capacity of use, and the pages are allocated to satisfy the required performance with a single RG.

If the required I/O performance reaches the maximum performance of the RG before allocating pages to the maximum capacity of the RG, such state is called a "performance neck (excessive capacity)", and the capacity of the area shown by the slanted lines in FIG. 32 (1) becomes excessive.

According to this state, the whole storage drive within the RG is fully operated, and no more reading or writing of data is enabled.

In contrast, the state where the required I/O performance is smaller than the maximum performance of the RG even when pages are allocated to the maximum capacity of the RG is called a "performance surplus (capacity neck)", and the performance of the area shown by the slanted lines of FIG. 30 (2) becomes excessive.

At first, the tier level (from Tier1 to Tier3) of the RG to be allocated is determined based on the cumulative curve 320 of the I/O distribution of the application. Since RG performance is required than the RG capacity according to the cumulative curve 320 of I/O distribution, the RG of Tier1 having high performance is selected and allocated.

The RG 321 of Tier1 allocated initially corresponds to this case. Since the RG 321 is in the state of the aforementioned "performance neck", another RG 322 in Tier1 is allocated thereafter. Even according to this case, the RG is in the state of "performance neck" similar to RG 321, so that RG 323 allocated thereafter is also of Tier1.

The RG 323 is in a "performance surplus (capacity neck)" state, so that the RG allocated thereafter is not of Tier1 but an RG 324 from Tier2 having lower performance but higher capacity. It is also possible to select RG 325 of Tier3, but since the level of performance neck and the level of excessive capacity are greater compared to Tier2, it is more preferable to allocate the RG of Tier2 than of Tier3.

The allocated RG 324 is in "performance surplus (capacity neck)" state, so that the RG allocated thereafter should be of Tier3.

The above-described allocation method enables to realize an RG allocation most preferable from the viewpoint of balance of required performance and required capacity.

Figure 33:
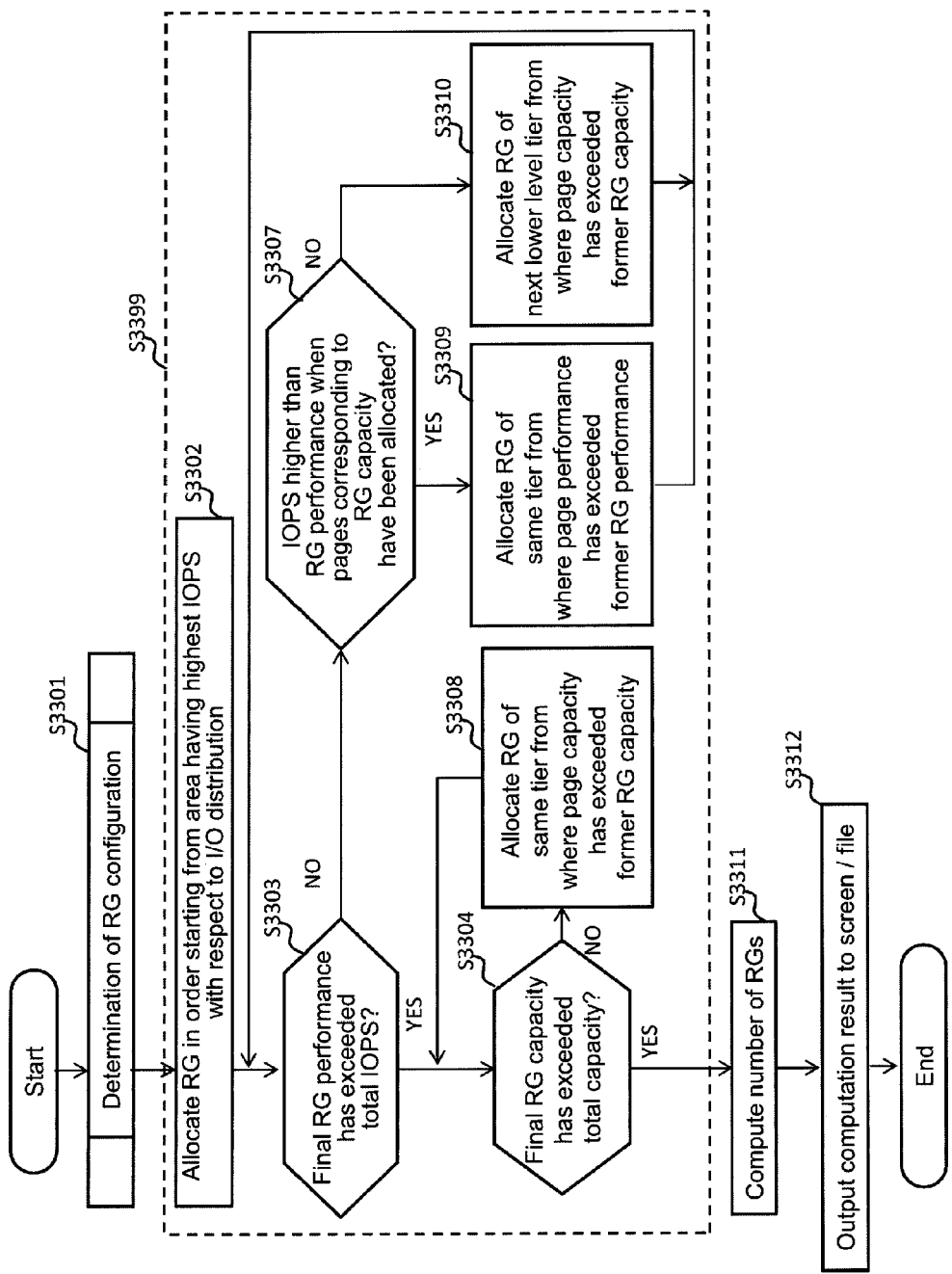
FIG. 33 is a flowchart showing the operation of the method for computing tier configuration.

FIG. 33 is a flowchart showing the operation of the method for computing the tier configuration.

Figure 34:
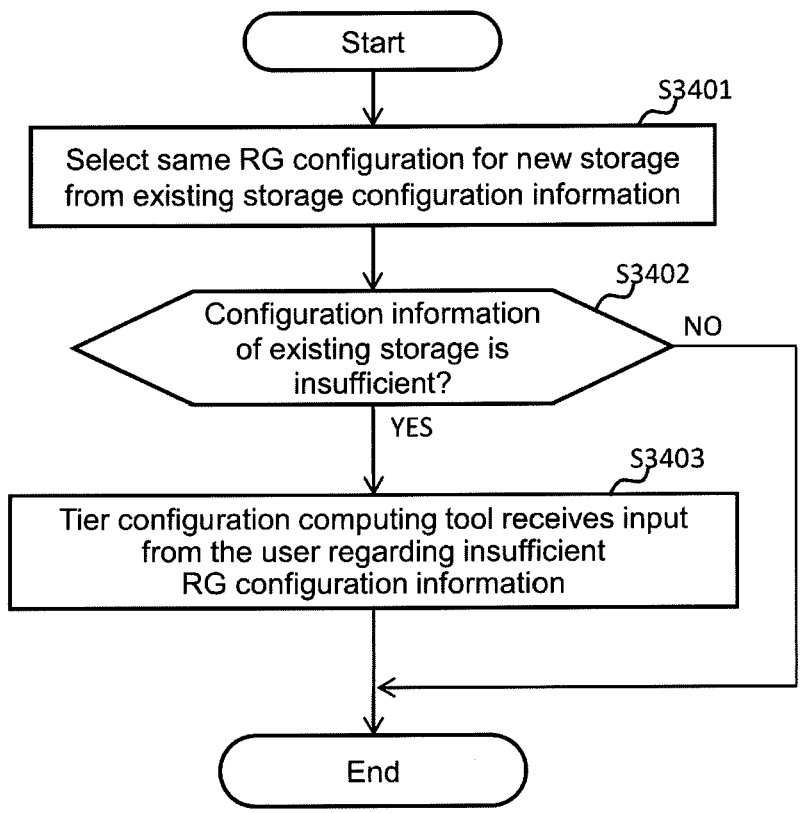
FIG. 34 is a flowchart showing the operation for determining RG configuration.

In S3301, the tier configuration computing tool 153 determines the RG configuration. The operation of the method for determining the RG configuration will be described with reference to FIG. 34. FIG. 34 is a flowchart showing the operation for determining the RG configuration.

In S3401, the tier configuration computing tool 153 receives the RG configuration information that the performance acquiring tool 151 has acquired from the existing storage subsystem 13. Then, the tier configuration computing tool 153 selects an RG configuration corresponding to the specification of the new storage subsystem from the acquired RG configuration information.

In S3402, the tier configuration computing tool 153 determines whether the RG configuration information of the existing storage subsystem 13 is insufficient or not in composing the RG in the new storage subsystem 17.

If the information is not insufficient (S3402: No), the tier configuration computing tool 153 ends the determination process of RG configuration, and if the information is insufficient (S3402: Yes), step S3403 is executed.

In S3403, the tier configuration computing tool 153 requires the user or the system administrator to enter the insufficient RG configuration information so as to compensate for the insufficient RG configuration information. The tier configuration computing tool 153 receives the insufficient RG configuration information entered from the user or the system administrator to complete the RG configuration information, and the process for determining the RG configuration is ended.

We will now return to the description of FIG. 33.

In S3302, the tier configuration computing tool 153 utilizes the RG management table 310 to allocate RGs in order from the area having the highest IOPS in the I/O distribution.

In S3303, the tier configuration computing tool 153 determines whether the total IOPS of the application has exceeded the final RG performance. In other words, the tool determines whether the total performance of the allocated RGs exceeds the performance required by the application (cumulative IOPS). The arranged RG should exceed the upper end of the cumulative curve of the I/O distribution.

If the RG performance exceeds the upper end of the curve (S3303: Yes), the tier configuration computing tool 153 executes step S3304, and if the performance does not exceed the curve (S3303: No), step S3307 is executed.

In S3304, the tier configuration computing tool 153 determines whether the final RG capacity exceeds the storage capacity required by the application. In other words, the tier configuration computing tool 153 determines whether the total capacity of the allocated RG exceeds the capacity required by the application (cumulative storage capacity). It is preferable if the RG is allocated from the right end of the cumulative curve of the I/O distribution.

If the total capacity of the RG exceeds the required capacity (S3304: Yes), the tier configuration computing tool 153 executes step S3311, and if not (S3304: No), the tool executes step S3308.

If both the performance and the capacity required by the application is satisfied, the tier configuration computing tool 153 computes the number of RGs of each tier (each storage drive) in S3311 and determines the tier configuration. Further, if the number of RGs for each of a plurality of applications is calculated, the total value thereof is also computed.

In S3312, the tier configuration computing tool 153 outputs the above-described computation result (result of tier configuration) to a screen or a file. Actually, the capacity and the percentage of each application illustrated in FIG. 39 described later, or the IOPS and the percentage of each application illustrated in FIG. 40 are output onto the screen of the management device 15.

In S3307, the tier configuration computing tool 153 determines whether the IOPS of the cumulative curve of I/O distribution is higher than the RG performance when pages corresponding to the RG capacity are allocated.

If the IOPS of the cumulative curve of I/O distribution is high (S3307: Yes), the tier configuration computing tool 153 executes step S3309, and if the IOPS is low (S3307: No), the procedure executes step S3310.

In S3309, the tier configuration computing tool 153 allocates the RG of the same tier from where the page performance exceeded the former RG performance.

In S3310, the tier configuration computing tool 153 allocates the next RG from the lower level tier from where the page capacity exceeded the former RG capacity.

After executing step S3309 or step S3310, the tier configuration computing tool 153 re-executes step S3303, and determines whether the final RG performance has exceeded the performance required by the application (cumulative IOPS) or not. The tier configuration computing tool 153 repeats step S3307 and step S3309 or step S3310 until the performance exceeds the required performance.

After the performance is satisfied, the tier configuration computing tool 153 performs the aforementioned capacity determination. If the capacity has not exceeded the total capacity (S3304: No), the tier configuration computing tool 153 allocates the RG from the same tier from where the page capacity has exceeded the former RG capacity. In this case, since the performance required by the application is satisfied, it is possible to allocate the RG from the lower level tier.

Thereafter, the tier configuration computing tool 153 re-executes S3304, and repeats the processes of S3304 and S3308 until the capacity is satisfied.

By the above-described process, the configuration of the tier (type and number of RGs) to be allocated to a single application can be computed. In order to compute the configuration of the tiers allocated to two or more applications, it is simply necessary to perform the process illustrated in FIG. 33 to each application.

FIG. 35 is a view illustrating the RG allocation method. The RG allocation performed in step S3309 and the method for performing RG allocation in step S3310 will be described with reference to FIG. 35.

FIG. 35 (a) illustrates an example where a lower level tier which is of a lower level than the current tier is allocated when performance surplus (capacity neck) occurs, which corresponds to the process of step S3310 of FIG. 33. That is, if the tier of the same level as page A is selected to be allocated to the next page, performance surplus will occur. Therefore, the tier configuration computing tool 153 allocates the RG of a next lower level tier from the position where the page capacity has exceeded the former RG capacity.

FIG. 35 (b) illustrates an example where a tier of the same level as the current tier is allocated when performance neck (capacity surplus) occurs, which corresponds to the process of step S3309 of FIG. 33. That is, if a tier level lower than that of page A is selected for the next page, the performance will not be satisfied. Therefore, the tier configuration computing tool 153 allocates the RG of the same tier from the position where the page performance has exceeded the former RG performance.

According to the above process, it becomes possible to compute the optimum tier configuration capable of satisfying the RG performance and the RG capacity required by the application. If data migration becomes necessary during the above process, the afore-mentioned inter-page migration processing described with reference to FIGS. 13A and 13B should be performed.

Next, we will described with reference to FIG. 36 the process of performing in page units the process of step S3399 (processes from S3302 to S3310) for performing a tier allocating operation in RG units.

Figure 36:
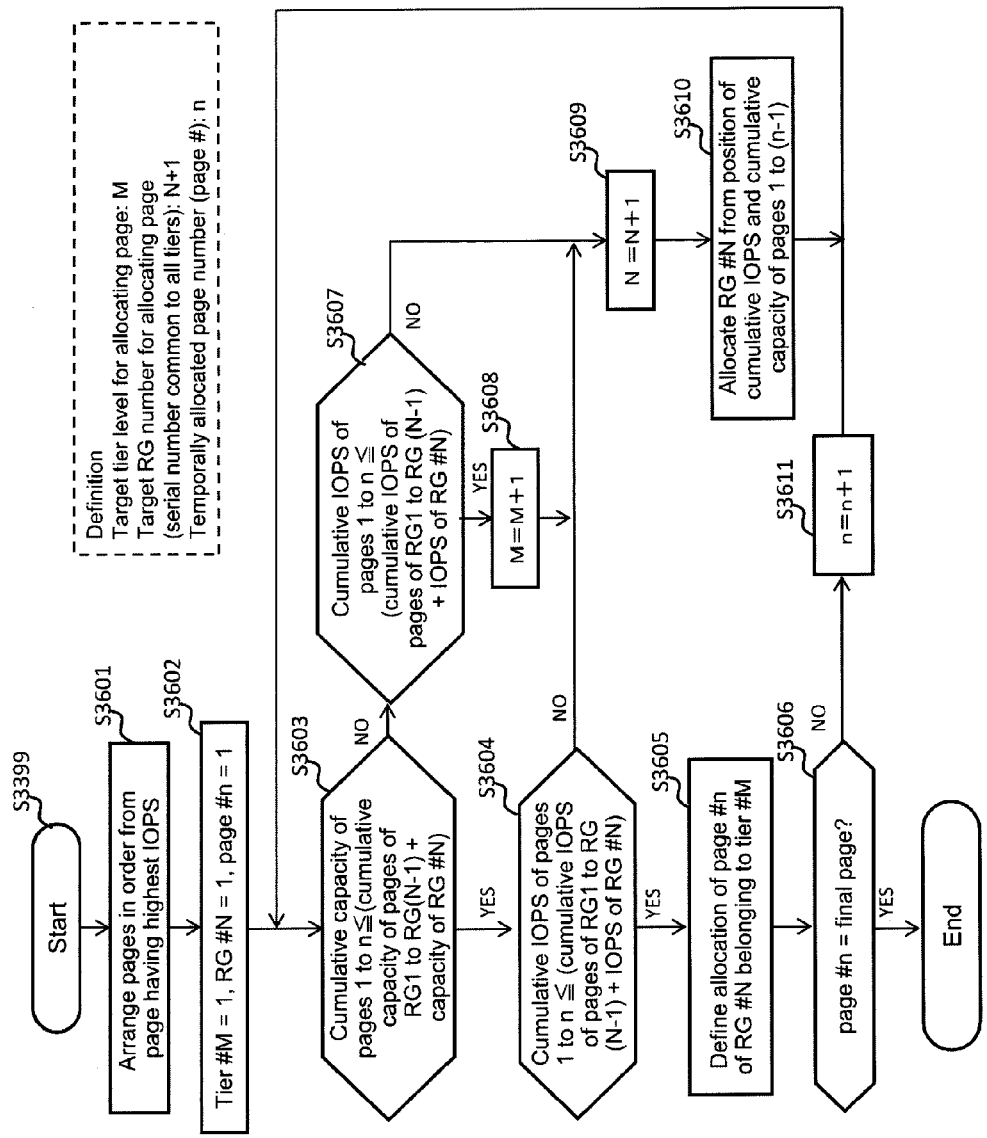
FIG. 36 is a flowchart showing the operation of a page allocation method for each tier.

FIG. 36 is a flowchart illustrating the operation of a page allocation method for each tier.

At first, the process is described by defining the following:
Target tier level for allocating page: M
Target RG number for allocating page (serial number common to all tiers): N+1
Page number for temporal allocation (page #): n In S3601, the tier configuration computing tool 153 refers to the virtual page management table 80, and arranges pages in order from pages having higher I/O count, that is, higher IOPS. In other words, the tier configuration computing tool 153 creates an I/O distribution graph sorting the I/O distribution (FIG. 24 (a)) which is the performance information acquired by the performance acquiring tool 151 in descending order as shown in FIG. 24 (b). Thereafter, the tier configuration computing tool 153 creates a cumulative curve of I/O distribution shown in FIG. 24 (d). It has been described that the process of S3601 is executed by the tier configuration computing tool 153, but as mentioned earlier, the process can be executed by the performance acquiring tool 151.

In S3602, the tier configuration computing tool 153 sets the following values as the initial value: Tier #M=1, RG #N=1, and page #n=1.

In S3603, the tier configuration computing tool 153 performs comparison of the cumulative capacity. That is, the tier configuration computing tool 153 determines whether the cumulative capacity from page 1 to page n being allocated temporarily is equal to or smaller than the total value of the page cumulative capacity from RG1 to RG (N−1) and the capacity of RG #N (RG capacity). The tier configuration computing tool 153 executes S3604 if the cumulative capacity from page 1 to page n being allocated temporarily is equal to or smaller than the total value (S3603: Yes), and if the capacity is not equal to or smaller than the RG capacity (S3603: No), it executes S3607.

In S3604, the tier configuration computing tool 153 compares the I/O count frequency, that is, the cumulative IOPS. That is, the tier configuration computing tool 153 determines whether the cumulative performance of IOPS from the temporarily allocated page 1 to page n is equal to or smaller than the total value of the cumulative IOPS of the pages allocated to RG1 to RG (N−1) and the maximum IOPS of RG #N (maximum RG performance).

If the cumulative performance of IOPS from page 1 to page n being temporarily allocated is equal to or smaller than the total value (S3604: Yes), the tier configuration computing tool 153 executes S3605, and if it is not equal to or smaller than the total value (S3604: No), the tool executes S3609.

In S3605, the tier configuration computing tool 153 determines in S3604 that performance surplus will occur if a page of the RG from the same tier level is allocated, so that the page of RG #N which belongs to a lower level tier # (M+1) is allocated as page #n. That is, as shown in FIG. 35 (a), the next page of page A is selected from the RG of the lower level tier and allocated.

In S3606, the tier configuration computing tool 153 determines whether page #n is the final page or not. If page #n is the final page (S3606: Yes), the tier configuration computing tool 153 ends the page allocation process of each tier, and if the page is not the final page (S3606; No), a process to increment page number n, that is, n=n+1, is executed in S3611. Then, the tier configuration computing tool 153 repeats the processes of S3603 and thereafter.

If the value is not equal to or smaller than the total value in S3603, the tier configuration computing tool 153 performs comparison of the I/O count frequency, that is, the cumulative IOPS in S3607. The process of S3607 is the same as that of S3604, wherein the tier configuration computing tool 153 determines whether the cumulative total (total value) of IPOS from page 1 to page n being temporarily allocated is equal to or smaller than the total value of the cumulative total IOPS of pages allocate from RG1 to RG(N−1) and the RG #N.

If the value is equal to or smaller than the total value (S3607: Yes), the tier configuration computing tool 153 executes S3608, and thereafter, executes S3609. That is, as shown in FIG. 35 (a), the page subsequent to the allocated page (page A) is selected from the RG of the lower level tier and allocated.

If the value is not equal to or smaller than the total value (S3607: No), the tier configuration computing tool 153 executes S3609. That is, as shown in FIG. 35 (b), the page subsequent to the allocated page (page A) is selected from the RG of the same tier and allocated.

The tier configuration computing tool 153 executes a process to decrement the target tier level (M=M+1) for allocating the page in S3608. This is because if the page of the same tier level is allocated, performance surplus will occur, so that the tier configuration computing tool 153 allocates the page of the tier of a level that is one-level lower.

Then, the tier configuration computing tool 153 executes a process to increment the target RG (serial number common among all tiers) N for allocating a page (N=N+1) so as to enable selection of the subsequent RG in S3609.

Next, the tier configuration computing tool 153 allocates RG #N from the position where the RG and page have been allocated (cumulative total IOPS and cumulative total capacity from page 1 to page n−1) in S3610.

The above-described processes can be summarized into the following processes (1) through (4).

(1) If the process is performed in the order of S3603, S3607 and S3609, both the capacity and the performance are insufficient, so the tier configuration computing tool 153 selects the next page from the RG belonging to the same tier and performs allocation (FIG. 35 (b)).

(2) If the process is performed in the order of S3603, S3607, S3608 and S3609, the capacity is insufficient but the performance is satisfied, so the tier configuration computing tool 153 selects the next page from the RG belonging to the lower level tier and performs allocation (FIG. 35 (a)). The next page to be temporarily allocated can be of the same tier instead of from the lower level tier.

(3) If the process is performed in the order of S3603, S3604 and S3609, the capacity is satisfied but the performance is insufficient, so the tier configuration computing tool 153 selects the next page from the RG belonging to the same tier and performs allocation (FIG. 35 (b)).

(4) If the process is performed in the order of S3603, S3604 and S3605, both the capacity and the performance are satisfied, so that the tier configuration computing tool 153 selects the next page from the RG belonging to the same tier and performs allocation.

As described, it is possible to temporarily allocate pages to all RGs, determine the performance/capacity neck and compute the optimum tier configuration. If data migration becomes necessary in the above-described process, the inter-page migration processing described earlier with reference to FIGS. 13A and 13B will be performed.

<Output Image of Computation Result of Tier Configuration>

FIGS. 37 to 41 show an output image of the computation result of tier configuration.

FIG. 37 is an output image view of the outline of the configuration information, which illustrates an output image of a storage subsystem information 3701 and a pool configuration information 3702. The storage subsystem information 3701 is composed of model name and function, and the pool configuration information 3702 is composed of pool number, tier, storage drive type, RG RAID level and number of drives.

FIG. 38 is an output image view of a pool configuration information 3801 and a capacity information 3802. The pool configuration information 3801 is composed for example of total pool capacity, used capacity, percentage being used, and access performance. The capacity information 3802 is composed for example of storage drive type of each tier level, the tier total capacity, and the used capacity.

FIG. 39 shows an output image of the computation result of tier use information 3901 for each application, State of use 3902 of each application using the respective tiers, and the access performance 3903 of each tier. For example, it can be seen from tier use information 3901 that application "Mail Server" uses 453 GB of Tier1 and 19548 GB of Tier2, and the ratio of tiers is 2% and 98%, respectively.

Further, application "Mail Server" uses 453 GB of Tier1, and application "OLTP (On-Line Transaction Processing) Database" uses 20000 GB of Tier1. The percentage of use of Tier1 by each application is 2% and 98%, respectively. Incidentally, only application "Mail Server" utilizes Tier2, and the percentage of use thereof is 100%.

FIG. 40 is an output image view of the computation result of IOPS and the like for each application and for each tier.

The IOPS of each tier used by the applications and the ratio thereof are shown in reference number 4001. The IOPS of each application using each tier and the ratio thereof are shown in reference number 4002 for each tier. Reference number 4003 shows the relative storage drive costs of tiers.

Figure 41:
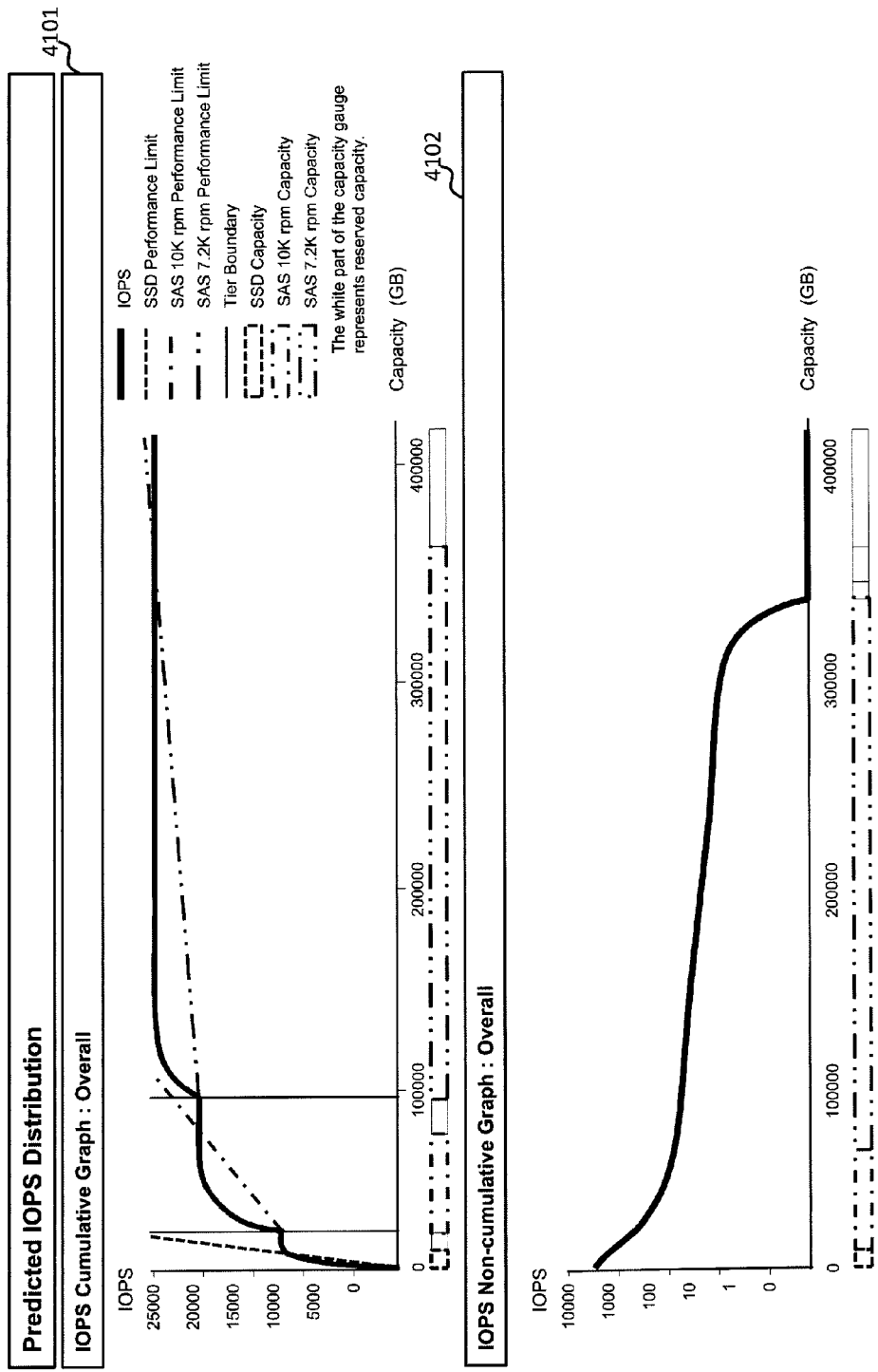
FIG. 41 is a view showing an output image of the result of computing the tier configuration.

FIG. 41 is an output image view of the computed I/O distribution, which illustrates the cumulative curve 4101 of I/O distribution and a non-cumulative curve 4102 of I/O distribution. The storage drives allocated to each I/O distribution and the total capacities thereof are also output to the output device 45 of the management device 15.

<RG Allocation of Multiple Applications>

Figure 43:
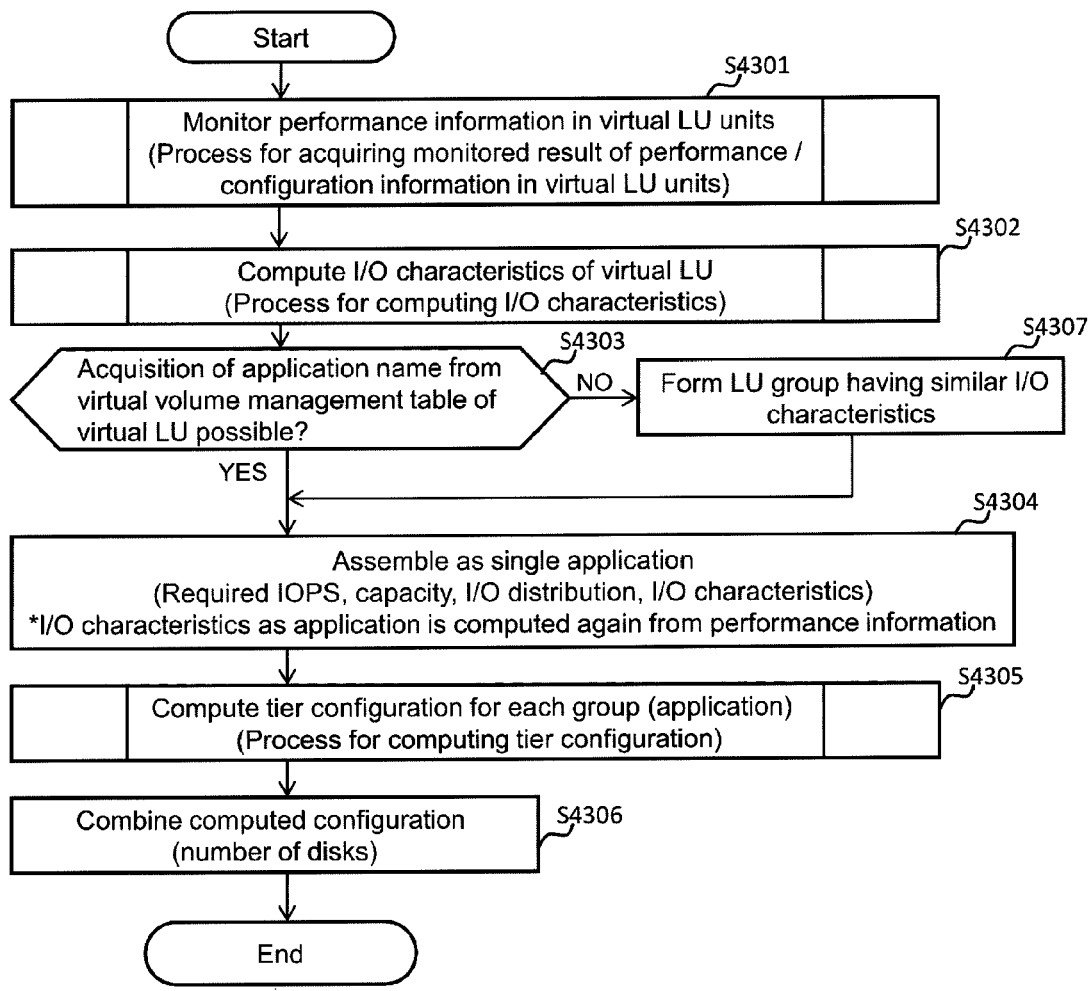
FIG. 43 is a flowchart showing the method for computing the tier configuration when multiple applications exist in mixture.

FIG. 42 illustrates a method for computing the tier configuration when multiple applications exist in mixture. FIG. 43 is a flowchart showing the operation of computing the tier configurations when multiple applications exist in mixture. The method for computing the tier configuration when multiple applications exist in mixture will be described with reference to FIGS. 42 and 43.

When multiple applications exist in mixture to one or more virtual LUs, the I/O distribution and the I/O characteristics of each application differ, so that the tier configuration is computed for each application, and the number of tiers and the number of disks of each storage drive are combined.

In other words, as shown in FIG. 42, the tier configuration computing tool 153 combines application A that uses 3 RG of Tier1, 1 RG of Tier2 and 2 RG of Tier3, and application B that uses 2 RG of Tier1, 1 RG of Tier2 and 2 RG of Tier3. The combined result is the actual tier configuration (Tier1: 5 RG, Tier2: 2 RG, Tier3: 4 RG).

The actual computing method includes the following processes (1) to (5).

(1) Monitoring of Performance (S4301 of FIG. 43)

The existing storage subsystem 13 monitors the performance information (virtual page management table 80) in virtual LU units. The performance acquiring tool 151 acquires the performance information monitored by the existing storage device. The performance acquiring tool 151 sends the acquired performance information to the tier configuration computing tool 153.

(2) Computing of I/O Characteristics (S4302 of FIG. 43)

The tier configuration computing tool receives the performance information from the performance acquiring tool 151. The tier configuration computing tool 153 computes the I/O characteristics of the virtual LU based on the received performance information.

(3) Grouping (S4303, S4304 and S4307 of FIG. 43)

The tier configuration computing tool 153 performs grouping of the virtual LUs having similar I/O characteristics, and assembles the required IOPS, capacity, I/O distribution and I/O characteristics as a single application. Incidentally, upon grouping virtual LUs having similar I/O characteristics, the tier configuration computing tool 153 can select those having similar values or percentages of I/O counts per I/O type (number of random/sequential, number of read/write) or the transfer block sizes in the virtual page management table 80.

If application names can be acquired from the application 703 in the virtual volume management table 70, the names can be used. Further, as for the I/O characteristics, the performance acquiring tool 151 re-computes the I/O characteristics as a single assembled application based on the acquired performance information.

(4) Computing of Tier Configuration for Each Group (S4305 of FIG. 43)

Tier configuration is computed for each group (each group of assembled applications).

(5) Combining of Configuration (S4306 of FIG. 43)

The obtained configuration (number of tiers and number of disks of storage drives) are combined.

As described, even if multiple applications having different I/O distribution and different I/O characteristics exist in mixture in a single virtual LU or multiple virtual LUs, it is possible to compute the tier configuration for each application and combine the number of tiers and the number of disks of the respective storage drives, to thereby compute the optimum tier configuration.

<Second RG Allocation Method>

Figure 44:
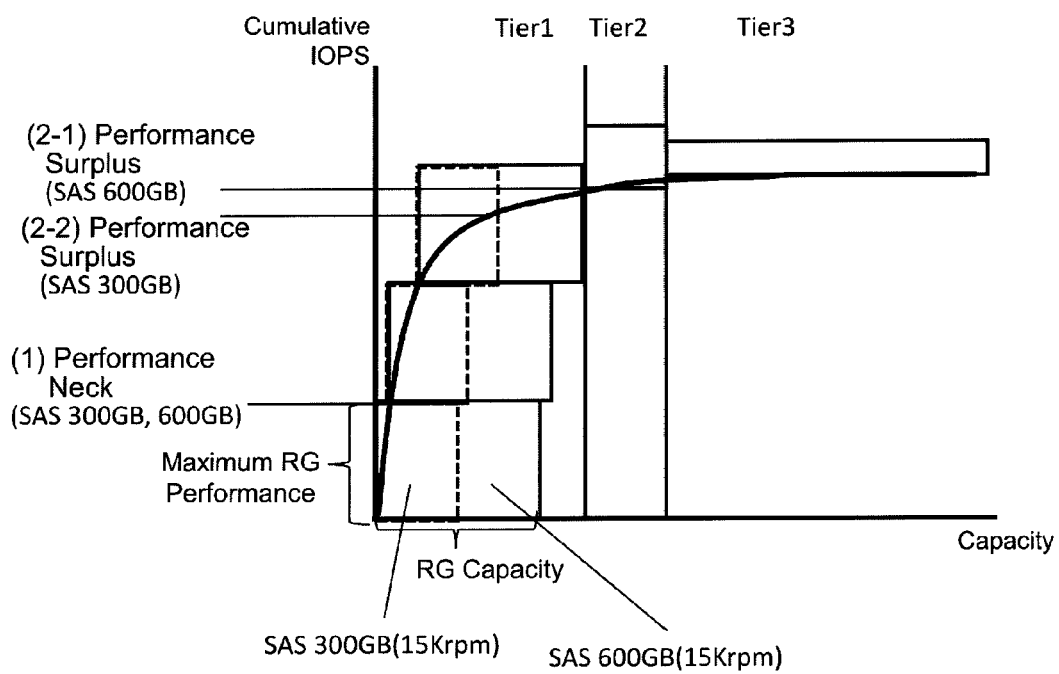
FIG. 44 is a view showing a method for computing the tier configuration based on RG capacity.

FIG. 44 is a view showing the method for computing tier configuration based on RG capacity.

Next, with reference to FIG. 44, the method for computing the tier configuration of an RG composed of storage drives having the same interface and same rotation speed (performance) but different capacities will be described.

(1) Performance Neck (Excessive Capacity)

In the case of a performance neck (where the required performance exceeds the RG performance), the used capacity within the allocated RG becomes equal among storage drives such as HDDs regardless of the difference in capacities. This is because the performance potential of the RG is fixed regardless of the size of the capacity being used.

The first and second RGs of (1) performance neck of FIG. 44 correspond to this case. From the viewpoint of efficient use of storage drives, in this case, it is preferable to select a storage drive having a higher percentage (IOPS/GB) of performance (IOPS) with respect to capacity (GB).

That is, in an HDD where the interface type is SAS and the rotation speed is 15 Krpm, the drive having a 300 GB capacity is selected over the drive having a 600 GB capacity. If it is possible to allocate an SSD 200 GB without causing performance surplus (capacity neck), it is preferable to select the HDD of SSD 200 GB over the HDD of SAS 300 GB (15 Krpm) (refer to performance/capacity difference of drive types of FIG. 30 (b)).

(2) Performance Surplus (Capacity Neck)

In the case of capacity neck (where the required performance is lower than the RG performance), the percentage of use of capacity can be enhanced as the capacity of the storage drives constituting the allocated RG increases, and the percentage can be approximated to 100%.

The third RG of (2-1) performance surplus of FIG. 44 corresponds to this case. From the viewpoint of efficient use of storage drives, it is preferable to select a storage drive having a higher percentage (GB/IOPS) of capacity (GB) with respect to performance (IOPS). That is, in the case of an HDD in which the interface type is SAS and the rotation speed is 15 Krpm, it is preferable to select a drive having a capacity of 600 GB over that of 300 GB.

If it is possible to allocate HDDs such as 600 GB SAS (10 rpm), 1 TG NL (Near Line) SAS (7.2 Krpm) or 2 TB type SATA without causing performance neck (excessive capacity), it is preferable to select such HDDs (refer to FIG. 30 (b)).

As described, even in a storage drive having the same interface and rotation speed (performance) according to the cumulative curve of I/O distribution, efficient use of storage drives can be enabled by selecting drives having different capacities. Further, it becomes possible to compute a more preferable tier configuration.

The number of tiers according to the above description is three, but it is possible to adopt a more defined tier configuration so as to increase the number of selectable tiers.

For example, a more preferable tier configuration can be computed by increasing the number of tiers from 3 to 6, such as by constituting Tier1 by 200 GB SSD, Tier2 by 300 GB SAS (15 rpm), Tier3 by 600 GB SAS (15 rpm), Tier4 by 600 GB SAS (10 rpm), Tier5 by 1 TB NL-SAS (10 rpm), and Tier6 by 2 TB SATA, so as to enable tiers to be selected via the tier configuration computing tool and to enable computation of a more preferable tier configuration.

The present invention is not restricted to the embodiments mentioned above, and other various modified examples are included in the scope of the invention. The preferred embodiments of the present invention have been merely illustrated for better understanding of the present invention, and they are not intended to restrict the scope of the present invention in any way. A portion of the configuration of an embodiment can be replaced with the configuration of another embodiment, and the configuration of an embodiment can be added to the configuration of another embodiment. Moreover, all portions of the configurations of the respective embodiments can have other configurations added thereto, deleted therefrom or replaced therewith.

Moreover, a portion or all of the configurations, functions, processing units, processing means and the like described in the description can be realized by hardware such as by designing integrated circuits. The respective configurations, functions and the like can also be realized by software such as by having a processor interpret the program for realizing the respective functions and execute the same.

The information such as the programs, tables, files and the like for realizing the respective functions can be stored in storage devices such as memories, hard disks and SSDs (Solid State Drives), or in storage media such as IC cards, SD cards and DVDs.

The control lines and information lines considered necessary for description are illustrated, and not necessarily all the control lines and information lines required for production are illustrated. Actually, it can be considered that almost all components are mutually connected.

REFERENCE SIGNS LIST

1 Storage subsystem
11 Host device
13 Existing storage subsystem
15 Management device
17 New storage subsystem
31 DKC (Disk Controller)
32 Front end interface (FE-IF)
33 Memory
34 Microprocessor (MP)
35 Data transfer circuit
36 Backend interface (BE-IF)
37 Backend connection device
38 Physical storage device (PDEV)
70 Virtual volume management table
80 Virtual page management table
90 Real page management table
100 Migration page table
151 Performance acquiring tool
152 Monitoring performance information
153 Tier configuration computing tool
203 I/O Distribution
204 I/O Characteristics

The invention claimed is:

1. A storage system comprising:
a management device; and
a storage subsystem coupled to one or more host computers; wherein
the storage subsystem is composed of
multiple types of physical storage device groups storing data transmitted from the host computers; and
a storage control unit for controlling the storage devices;
wherein the storage control unit is composed of
a storage unit; and
a controller coupled to the multiple types of physical storage device groups, the storage unit and the host computer;
the physical storage device group being composed of one or more physical storage devices;
the multiple types of physical storage device groups being a base of multiple types of real page groups;
the types of real page groups being based on attributes of the physical storage device groups being the base of the real page groups;
the real page groups having multiple real pages;
the controller providing one or more virtual volumes to the one or more hosts;
the virtual volume being a virtual logical volume composed of multiple virtual pages;
the virtual page being a virtual storage area;
the real page being a substantive storage area;
the storage unit being caused to store an allocation information indicating the allocation relationship of real pages to virtual pages;
a configuration information indicating a configuration of the storage subsystem; and
a monitored information which is information indicating an I/O type and an I/O frequency for each I/O type of each virtual page of the virtual volume; and wherein
the controller is caused to update the I/O frequency of a certain virtual page in the monitored information according to the I/O of the certain virtual page or of a real page allocated to the certain virtual page; and
the management device is caused to create a cumulative curve of I/O distribution of the I/O frequency and the capacity of the virtual page based on the monitored information;
compare a storage area in given units of the physical storage device groups to the created cumulative curve of I/O distribution; and
compute the configuration of the physical storage device groups that satisfies a given performance requirement in the I/O distribution based on the compared result; and
wherein the management device is caused to perform the following processes so as to create the cumulative curve of I/O distribution:

(1) rearrange virtual pages in order from the virtual pages having greater I/O frequency to the virtual pages having smaller I/O frequency;
(2) assemble the rearranged virtual pages in units of a given number of pages;
(3) calculate a percentage of each virtual page with respect to a total I/O frequency and computing a percentage of cumulative I/O frequency;
(4) calculate a percentage of each virtual page with respect to a total storage capacity of the virtual pages and compute a percentage of cumulative storage capacity;
(5) multiply the total number of I/O frequency by the percentage of cumulative I/O frequency so as to compute the cumulative I/O frequency; and
(6) multiply the total storage capacity by the percentage of cumulative storage capacity so as to compute the cumulative storage capacity.

2. The storage system according to claim 1, wherein the given unit is a RAID group unit composed of the physical storage device group.

3. The storage system according to claim 2, wherein the computation of the configuration of the physical storage device groups is performed through comparison starting from a RAID group unit having a high access performance out of the RAID group units composed of the physical storage device groups.

4. The storage system according to claim 3, wherein the computation of the configuration of the physical storage device groups is performed so that when the cumulative curve of I/O distribution exceeds either a performance limitation value or a maximum capacity of the RAID group, a subsequent RAID group is selected.

5. The storage system according to claim 3, wherein the computation of the configuration of the physical storage device groups is performed so that when the cumulative curve of I/O distribution exceeds either a performance limitation value or a maximum capacity of the RAID group, a performance or a capacity of the subsequent RAID group is determined.

6. The storage system according to claim 5, wherein when the cumulative curve of I/O distribution exceeds the performance limitation value of the RAID group, the performance of the subsequent RAID group is equal to the performance of the previous RAID group.

7. The storage system according to claim 5, wherein when the cumulative curve of I/O distribution exceeds the maximum capacity of the RAID group, the performance of the subsequent RAID group has a smaller performance and greater capacity than the previous RAID group.

8. The storage system according to claim 1, further comprising a monitored information template for each environment of use of the storage subsystem, wherein the monitored information template is used for supplementation of an insufficient monitored information during the process for creating the cumulative curve of I/O distribution.

9. The storage system according to claim 1, wherein the management device has an information output device, and the allocated storage area in given units of the physical storage device group is output to the information output device.

10. The storage system according to claim 1, wherein the storage subsystem performs allocation of storage areas in given units of the physical storage device group to a first virtual volume, allocation of storage areas in given units of the physical storage device group to a second virtual volume, and the management device computes the a number of storage areas in given units being allocated in each physical storage device group.

11. A storage control method of a storage subsystem, wherein
data from host computers are stored in multiple types of physical storage devices, the multiple[s] types of physical storage device groups being a base of multiple types of real page groups, the real page groups having multiple real pages, a virtual volume being a virtual logical volume composed of one or more virtual pages is provided to the one or more host computers, the virtual page being a virtual storage area, and the real page being a substantive storage area;
wherein the method comprises:
acquiring a storage configuration information, and a monitored information which is information indicating an I/O type of each virtual page of the virtual volume and an I/O frequency of each I/O type; and
creating a cumulative curve of I/O distribution for each virtual volume based on the storage configuration information and the monitored information, and allocating a storage area in given units of the physical storage device groups to the created cumulative curve of I/O distribution; and
performing the following processes so as to create the cumulative curve of I/O distribution:
(1) rearrange virtual pages in order from the virtual pages having greater I/O frequency to the virtual pages having smaller I/O frequency;
(2) assemble the rearranged virtual pages in units of a given number of pages;
(3) calculate a percentage of each virtual page with respect to a total I/O frequency and computing a percentage of cumulative I/O frequency;
(4) calculate a percentage of each virtual page with respect to a total storage capacity of the virtual pages and compute a percentage of cumulative storage capacity;
(5) multiply the total number of I/O frequency by the percentage of cumulative I/O frequency so as to compute the cumulative I/O frequency; and
(6) multiply the total storage capacity by the percentage of cumulative storage capacity so as to compute the cumulative storage capacity.

12. A storage control program of a management device coupled to a storage subsystem having data from host computers stored in multiple types of physical storage devices, the multiples types of physical storage device groups being a base of multiple types of real page groups, the real page groups having multiple real pages, a virtual volume being a virtual logical volume composed of one or more virtual pages being provided to the one or more host computers, the virtual page being a virtual storage area, and the real page being a substantive storage area;
wherein the program comprises:
a first function for acquiring a storage configuration information, and a monitored information which is information indicating an I/O type of each virtual page of the virtual volume and an I/O frequency of each I/O type; and
a second function for creating a cumulative curve of I/O distribution for each virtual volume based on the storage configuration information and the monitored information, and allocating a storage area in given units of the physical storage device groups to the created cumulative curve of I/O distribution; and
wherein the management device is caused to perform the following processes so as to create the cumulative curve of I/O distribution:

(1) rearrange virtual pages in order from the virtual pages having greater I/O frequency to the virtual pages having smaller I/O frequency:
(2) assemble the rearranged virtual pages in units of a given number of pages;
(3) calculate a percentage of each virtual page with respect to a total I/O frequency and computing a percentage of cumulative I/O frequency;
(4) calculate a percentage of each virtual page with respect to a total storage capacity of the virtual pages and compute a percentage of cumulative storage capacity;
(5) multiply the total number of I/O frequency by the percentage of cumulative I/O frequency so as to compute the cumulative I/O frequency; and
(6) multiply the total storage capacity by the percentage of cumulative storage capacity so as to compute the cumulative storage capacity.

* * * * *